(12) United States Patent
Meng et al.

(10) Patent No.: US 10,878,261 B2
(45) Date of Patent: Dec. 29, 2020

(54) DRIVING MANAGEMENT METHODS AND SYSTEMS, VEHICLE-MOUNTED INTELLIGENT SYSTEMS, ELECTRONIC DEVICES, AND MEDIUM

(71) Applicant: Shanghai Sensetime Intelligent Technology Co., Ltd., Shanghai (CN)

(72) Inventors: De Meng, Shanghai (CN); Ke Li, Shanghai (CN); Chendi Yu, Shanghai (CN); Renbo Qin, Shanghai (CN)

(73) Assignee: SHANGHAI SENSETIME INTELLIGENT TECHNOLOGY CO., LTD, Shanghai (CN)

(*) Notice: Subject to any disclaimer, the term of this patent is extended or adjusted under 35 U.S.C. 154(b) by 134 days.

(21) Appl. No.: 16/224,389

(22) Filed: Dec. 18, 2018

(65) Prior Publication Data

US 2019/0370577 A1 Dec. 5, 2019

Related U.S. Application Data

(63) Continuation of application No. PCT/CN2018/105790, filed on Sep. 14, 2018.

(30) Foreign Application Priority Data

Jun. 4, 2018 (CN) .......................... 2018 1 0565711

(51) Int. Cl.
*G06K 9/00* (2006.01)
*G05D 1/00* (2006.01)
(Continued)

(52) U.S. Cl.
CPC ........... *G06K 9/00845* (2013.01); *B60Q 9/00* (2013.01); *G05D 1/0061* (2013.01);
(Continued)

(58) Field of Classification Search
CPC ........... G06K 9/00221; G06K 9/00281; G06K 9/00288; G06K 9/00302; G06K 9/00845;
(Continued)

(56) References Cited

U.S. PATENT DOCUMENTS

| 7,362,210 B2 | 4/2008 | Bazakos et al. | 340/5.53 |
| 8,300,891 B2 | 10/2012 | Chen et al. | 382/103 |

(Continued)

FOREIGN PATENT DOCUMENTS

| CN | 101902619 A | 12/2010 |
| CN | 102975690 A | 3/2013 |

(Continued)

OTHER PUBLICATIONS

Supplementary European Search Report in the European application No. 18919403.8, dated Jul. 7, 2020.

(Continued)

*Primary Examiner* — Andrew W Johns
(74) *Attorney, Agent, or Firm* — Syncoda LLC; Feng Ma

(57) ABSTRACT

Embodiments of the present disclosure disclose driving management methods and systems, vehicle-mounted intelligent systems, electronic devices, and medium. The method includes: controlling a camera assembly provided on a vehicle to collect a video stream of a vehicle driver; obtaining a feature matching result of a face part of at least one image in the video stream and at least one pre-stored face image in a data set, where the data set stores a pre-stored face image of at least one registered driver; and if the feature matching result represents that the feature matching is successful, controlling the vehicle to execute an operation instruction received by the vehicle. The embodiments of the present disclosure reduce the dependence of the driver (Continued)

identification on a network, can realize feature matching without the network, and further improve the safety guarantee of the vehicle.

31 Claims, 7 Drawing Sheets

(51) Int. Cl.
*G06K 9/62* (2006.01)
*G06T 7/70* (2017.01)
*B60Q 9/00* (2006.01)

(52) U.S. Cl.
CPC ..... *G06K 9/00228* (2013.01); *G06K 9/00288* (2013.01); *G06K 9/00906* (2013.01); *G06K 9/00926* (2013.01); *G06K 9/6202* (2013.01); *G06K 9/628* (2013.01); *G06T 7/70* (2017.01); *G05D 2201/0213* (2013.01); *G06T 2207/10016* (2013.01); *G06T 2207/30201* (2013.01); *G06T 2207/30268* (2013.01)

(58) Field of Classification Search
CPC ........... G06T 2207/30201; G06T 2207/30268; B60K 28/02; B60K 28/04; B60K 28/06; B60K 28/063; B60K 28/066
See application file for complete search history.

(56) References Cited

U.S. PATENT DOCUMENTS

| | | | | |
|---|---|---|---|---|
| 9,317,759 | B2 | 4/2016 | Inada et al. | G06K 9/00845 |
| 9,751,534 | B2 | 9/2017 | Fung et al. | B60W 40/08 |
| 9,963,106 | B1 | 5/2018 | Ricci | B60R 25/2018 |
| 2005/0110610 | A1 | 5/2005 | Bazakos et al. | 340/5.82 |
| 2006/0072792 | A1 | 4/2006 | Toda et al. | 382/115 |
| 2008/0252412 | A1 | 10/2008 | Larsson et al. | 340/5.2 |
| 2008/0297330 | A1 | 12/2008 | Jeon | 340/426.11 |
| 2009/0046538 | A1 | 2/2009 | Breed et al. | 367/93 |
| 2011/0091079 | A1 | 4/2011 | Yu-Song et al. | 382/118 |
| 2014/0139655 | A1* | 5/2014 | Mimar | G08B 21/0476 348/77 |
| 2014/0369553 | A1* | 12/2014 | Tsou et al. | G06K 9/00281 382/103 |
| 2015/0010207 | A1 | 1/2015 | Inada et al. | G06K 9/00845 |
| 2016/0001781 | A1 | 1/2016 | Fung et al. | B60W 40/08 |
| 2016/0300410 | A1* | 10/2016 | Jones et al. | G06K 9/00348 |
| 2016/0311400 | A1 | 10/2016 | Gennermann | B60R 25/2018 |
| 2017/0341658 | A1 | 11/2017 | Fung et al. | B60W 40/08 |
| 2018/0022358 | A1 | 1/2018 | Fung et al. | B60W 40/08 |
| 2018/0025240 | A1* | 1/2018 | Klement et al. | H04N 13/239 348/47 |
| 2018/0126901 | A1 | 5/2018 | Levkova et al. | B60Q 9/00 |
| 2018/0127001 | A1 | 5/2018 | Ricci | B60W 40/09 |
| 2018/0129204 | A1 | 5/2018 | Ricci et al. | G05D 1/0088 |
| 2018/0130347 | A1 | 5/2018 | Ricci et al. | G08G 1/0125 |
| 2018/0215392 | A1* | 8/2018 | Kosaka et al. | G05D 1/0276 |
| 2018/0312168 | A1* | 11/2018 | Li | B60W 40/08 |
| 2019/0108407 | A1* | 4/2019 | Okayasu | A61B 5/0013 |
| 2019/0122525 | A1 | 4/2019 | Lancelle | G08G 21/06 |
| 2019/0152390 | A1 | 5/2019 | Levkova et al. | B60Q 9/00 |
| 2019/0241190 | A1 | 8/2019 | Fung et al. | B60W 40/08 |
| 2019/0276032 | A1 | 9/2019 | Fung et al. | B60W 40/08 |
| 2019/0276033 | A1 | 9/2019 | Fung et al. | B60W 40/08 |
| 2019/0276034 | A1 | 9/2019 | Fung et al. | B60W 40/08 |
| 2019/0300002 | A1 | 10/2019 | Fung et al. | B60W 40/08 |
| 2020/0218883 | A1 | 7/2020 | Wang et al. | |

FOREIGN PATENT DOCUMENTS

| | | |
|---|---|---|
| CN | 103303257 A | 9/2013 |
| CN | 104143090 A | 11/2014 |
| CN | 104169993 A | 11/2014 |
| CN | 104408878 A | 3/2015 |
| CN | 104732251 A | 6/2015 |
| CN | 105035025 A | 11/2015 |
| CN | 105469035 A | 4/2016 |
| CN | 105654753 A | 6/2016 |
| CN | 105843375 A | 8/2016 |
| CN | 106218405 A | 12/2016 |
| CN | 106335469 A | 1/2017 |
| CN | 107316363 A | 11/2017 |
| CN | 107578025 A | 1/2018 |
| CN | 107657236 A | 2/2018 |
| CN | 107832748 A | 3/2018 |
| CN | 107891746 A | 4/2018 |
| CN | 108022451 A | 5/2018 |
| CN | 207433445 U | 6/2018 |
| DE | 202008005694 U1 | 7/2008 |
| FR | 3048544 A1 | 9/2017 |
| JP | 2011032782 A | 2/2011 |
| WO | 2007008159 A2 | 1/2007 |
| WO | 2008147036 A1 | 12/2008 |
| WO | 2015091679 A1 | 6/2015 |
| WO | 2017193272 A1 | 11/2017 |

OTHER PUBLICATIONS

First Office Action of the Chinese application No. 201810565700.3, dated Jul. 1, 2019.
International Search Report in the international application No. PCT/CN2018/105809, dated Mar. 6, 2019.
Non Final Office Action of the U.S. Appl. No. 16/233,064, dated Jul. 28, 2020.
International Search Report in the international application No. PCT/CN2018/105790, dated Mar. 8, 2019.
Supplementary European Search Report in the European application No. 18919400.4, dated Jun. 5, 2020.
First Office Action of the Chinese application No. 201810565711.1, dated Apr. 30, 2020.

* cited by examiner

DRIVING MANAGEMENT METHODS AND SYSTEMS, VEHICLE-MOUNTED INTELLIGENT SYSTEMS, ELECTRONIC DEVICES, AND MEDIUM

CROSS-REFERENCE TO RELATED APPLICATIONS

This is a continuation of International Application PCT/CN2018/105790, with an international filing date of Sep. 14, 2018, which claims priority to Chinese Patent Application No. 201810565711.1, filed with the China National Intellectual Property Administration (CNIPA) on Jun. 4, 2018 and entitled "DRIVING MANAGEMENT METHODS AND SYSTEMS, VEHICLE-MOUNTED INTELLIGENT SYSTEMS, ELECTRONIC DEVICES, AND MEDIUM", the contents of which are incorporated herein by reference in their entireties.

TECHNICAL FIELD

The present disclosure relates to artificial intelligence technologies, and in particular, to driving management methods and systems, vehicle-mounted intelligent systems, electronic devices, and medium.

BACKGROUND

Intelligent vehicle is a comprehensive system integrating environment perception, planning decision-making, multi-level assisted driving and other functions, and uses computer, modern sensing, information fusion, communication, artificial intelligence, automatic control and other technologies, and it is a typical high-tech complex. At present, the research on intelligent vehicles is mainly aimed at improving the safety and comfort of automobiles and providing an excellent human-vehicle interactive interface. In recent years, intelligent vehicles have become the hotspot of research in the field of vehicle engineering in the world and the new driving force for the growth of the automobile industry. Many developed countries have incorporated the intelligent vehicles into their own intelligent transportation systems.

SUMMARY

Embodiments of the present disclosure provide driving management methods and systems, vehicle-mounted intelligent systems, electronic devices, and medium.

A driving management method provided according to one aspect of the embodiments of the present disclosure includes: controlling a camera assembly provided on a vehicle to collect a video stream of a vehicle driver; obtaining a feature matching result of a face part of at least one image in the video stream and at least one pre-stored face image in a data set, where the data set stores a pre-stored face image of at least one registered driver; and if the feature matching result represents that the feature matching is successful, controlling the vehicle to execute an operation instruction received by the vehicle.

Optionally, the method further includes: when the vehicle and a cloud server are in a communication connection state, sending a data set download request to the cloud server; and receiving and storing the data set sent by the cloud server.

Optionally, the method further includes: if the feature matching result represents that the feature matching is successful, obtaining identity information of the vehicle driver according to the pre-stored face image that is succeeded in feature matching; and sending the image and the identity information to the cloud server.

Optionally, the method further includes: if the feature matching result represents that the feature matching is successful, obtaining identity information of the vehicle driver according to the pre-stored face image that is succeeded in feature matching; intercepting the face part in the image; and sending the intercepted face part and the identity information to the cloud server.

Optionally, the method further includes: obtaining a living body detection result of the collected image; the controlling the vehicle to execute an operation instruction received by the vehicle according to the feature matching result includes: controlling the vehicle to execute an operation instruction received by the vehicle according to the feature matching result and the living body detection result.

Optionally, the pre-stored face image in the data set is also correspondingly provided with a driving permission; the method further includes: if the feature matching result represents that the feature matching is successful, obtaining the driving permission corresponding to the pre-stored face image that is succeeded in feature matching; the controlling the vehicle to execute an operation instruction received by the vehicle includes: controlling the vehicle to execute an operation instruction received by the vehicle within the permission scope.

Optionally, the method further includes: performing driver state detection based on the video stream; and performing at least one of: prompting early-warning on an abnormal driving state or performing intelligent driving control according to the result of the driver state detection.

Optionally, the driver state detection includes at least one of: driver fatigue state detection, driver distraction state detection, driver's predetermined distraction action detection, or driver gesture detection.

Optionally, the performing driver fatigue state detection based on the video stream includes: detecting at least a part of a face region of at least one image in the video stream to obtain state information of the at least a part of the face region, the state information of the at least a part of the face region including at least one of: eye open/closed state information or mouth open/closed state information; obtaining a parameter value of an index for representing a driver fatigue state according to the state information of the at least a part of the face region within a period of time; and determining the result of the driver fatigue state detection according to the parameter value of the index for representing the driver fatigue state.

Optionally, the index for representing the driver fatigue state includes at least one of: an eye closure degree or a yawning degree.

Optionally, the parameter value of the eye closure degree includes at least one of: the number of eye closures, eye closure frequency, eye closure duration, eye closure amplitude, the number of eye semi-closures, or eye semi-closure frequency; the parameter value of the yawning degree includes at least one of: a yawning state, the number of yawns, yawn duration, or yawning frequency.

Optionally, the performing driver distraction state detection based on the video stream includes: performing at least one of face orientation or gaze direction detection on the driver image in the video stream to obtain at least one of face orientation information or gaze direction information; determining a parameter value of an index for representing a driver distraction state according to at least one of the face orientation information or the gaze direction information within a period of time, the index for representing the driver distraction state includes at least one of: a face orientation deviation degree or a gaze deviation degree; and determining the result of the driver distraction state detection according to the parameter value of the index for representing the driver distraction state.

Optionally, the parameter value of the face orientation deviation degree includes at least one of: the number of head turns, head turn duration, or head turn frequency; the parameter value of the gaze deviation degree includes at least one of: a gaze direction deviation angle, gaze direction deviation duration, or gaze direction deviation frequency.

Optionally, the performing at least one of face orientation or gaze direction detection on the driver image in the video stream includes: detecting face key points of the driver image in the video stream; and performing at least one of face orientation or gaze direction detection according to the face key points.

Optionally, the performing face orientation detection according to the face key points to obtain face orientation information includes: obtaining feature information of head posture according to the face key points; and determining the face orientation information according to the feature information of the head posture.

Optionally, the predetermined distraction action includes at least one of: a smoking action, a drinking action, an eating action, a calling action, or an entertainment action.

Optionally, the performing driver's predetermined distraction action detection based on the video stream includes: performing target object detection corresponding to the predetermined distraction action on at least one image in the video stream to obtain a detection frame for a target object; and determining whether the predetermined distraction action occurs according to the detection frame for the target object.

Optionally, the method further includes: if the predetermined distraction action occurs, obtaining a parameter value of an index for representing the driver's distraction degree according to a determination result indicating whether the predetermined distraction action occurs within a period of time; and determining the result of the driver's predetermined distraction action detection according to the parameter value of the index for representing the driver's distraction degree.

Optionally, the parameter value of the index for representing the driver's distraction degree includes at least one of: the number of occurrences of the predetermined distraction action, duration of the predetermined distraction action, or frequency of the predetermined distraction action.

Optionally, the method further includes: if the result of the driver's predetermined distraction action detection is that a predetermined distraction action is detected, prompting the detected distraction action.

Optionally, the method further includes: executing a control operation corresponding to the result of the driver state detection.

Optionally, the executing a control operation corresponding to the result of the driver state detection includes at least one of: if the determined result of the driver state detection satisfies a predetermined prompt/warning condition, outputting prompt/warning information corresponding to the predetermined prompt/warning condition; if the determined result of the driver state detection satisfies a predetermined information sending condition, sending predetermined information to a predetermined contact or establishing a communication connection to the predetermined contact; if the determined result of the driver state detection satisfies a predetermined driving mode switching condition, switching the driving mode to an automatic driving mode.

Optionally, the method further includes: sending at least a part of the result of the driver state detection to the cloud server.

Optionally, the at least a part of the result includes abnormal driving state information determined according to the driver state detection.

Optionally, the method further includes: storing images or video clips in the video stream corresponding to the abnormal driving state information; and/or, sending the images or video clips in the video stream corresponding to the abnormal driving state information to the cloud server.

Optionally, the method further includes: when the vehicle and a mobile device are in a communication connection state, sending a data set download request to the mobile device; and receiving and storing the data set sent by the mobile device.

Optionally, the data set is obtained from the cloud server and sent to the vehicle by the mobile device upon reception of the data set download request.

Optionally, the method further includes: if the feature matching result represents that the feature matching is unsuccessful, refusing to execute the received operation instruction.

Optionally, the method further includes: sending registration prompt information; receiving a driver registration request according to the registration prompt information, the driver registration request including registered face images of the driver; and establishing a data set according to the registered face images.

Optionally, the obtaining a feature matching result of a face part of at least one image in the video stream and at least one pre-stored face image in a data set includes: when the vehicle and the cloud server are in a communication connection state, uploading the face part of at least one image in the video stream to the cloud server, and receiving the feature matching result sent by the cloud server.

A vehicle-mounted intelligent system provided according to another aspect of the embodiments of the present disclosure includes: a video collection unit, configured to control a camera assembly provided on a vehicle to collect a video stream of a vehicle driver; a result obtaining unit, configured to obtain a feature matching result of a face part of at least one image in the video stream and at least one pre-stored face image in a data set, where the data set stores a pre-stored face image of at least one registered driver; and an operation unit, configured to control, if the feature matching result represents that the feature matching is successful, the vehicle to execute an operation instruction received by the vehicle.

A driving management method provided according to still another aspect of the embodiments of the present disclosure includes: receiving a to-be-identified face image sent by a vehicle; obtaining a feature matching result of the face image and at least one pre-stored face image in a data set, where the data set stores a pre-stored face image of at least one registered driver; and if the feature matching result represents that the feature matching is successful, sending an instruction of allowing controlling the vehicle to the vehicle.

Optionally, the method further includes: receiving a data set download request sent by the vehicle, the data set storing a pre-stored face image of at least one registered driver; and sending the data set to the vehicle.

Optionally, the method further includes: receiving a driver registration request sent by the vehicle or the mobile device, the driver registration request including a registered face image of the driver; and establishing a data set according to the registered face image.

Optionally, the obtaining a feature matching result of the face image and at least one pre-stored face image in a data set includes: performing feature matching on the face image and at least one pre-stored face image in the data set to obtain the feature matching result.

Optionally, the obtaining a feature matching result of the face image and at least one pre-stored face image in a data set includes: obtaining the feature matching result of the face image and at least one pre-stored face image in the data set from the vehicle.

Optionally, the method further includes: receiving at least a part of the result of the driver state detection sent by the vehicle, performing at least one of prompting early-warning on an abnormal driving state or sending an instruction of intelligent driving control to the vehicle.

Optionally, the at least a part of the result includes abnormal driving state information determined according to the driver state detection.

Optionally, the method further includes: executing a control operation corresponding to the result of the driver state detection.

Optionally, the executing a control operation corresponding to the result of the driver state detection includes: if the determined result of the driver state detection satisfies a predetermined prompt/warning condition, outputting prompt/warning information corresponding to the predetermined prompt/warning condition; and/or, if the determined result of the driver state detection satisfies a predetermined information sending condition, sending predetermined information to a predetermined contact or establishing a communication connection to the predetermined contact; and/or, if the determined result of the driver state detection satisfies a predetermined driving mode switching condition, switching the driving mode to an automatic driving mode.

Optionally, the method further includes: receiving images or video clips corresponding to the abnormal driving state information.

Optionally, the method further includes: performing at least one of the following operations based on the abnormal driving state information: data statistics, vehicle management, or driver management.

Optionally, the performing data statistics based on the abnormal driving state information includes: collecting statistics about the received images or video clips corresponding to the abnormal driving state information based on the abnormal driving state information so that the images or video clips are classified according to different abnormal driving states to determine the statistical situation of each of the abnormal driving states.

Optionally, the performing vehicle management based on the abnormal driving state information includes: collecting statistics about the received images or video clips corresponding to the abnormal driving state information based on the abnormal driving state information so that the images or video clips are classified according to different vehicles to determine the abnormal driving statistical situation of each of the vehicles.

Optionally, the performing driver management based on the abnormal driving state information includes: processing the received images or video clips corresponding to the abnormal driving state information based on the abnormal driving state information so that the images or video clips are classified according to different drivers to determine the abnormal driving statistical situation of each of the drivers.

An electronic device provided according to yet another aspect of the embodiments of the present disclosure includes: an image receiving unit, configured to receive a to-be-identified face image sent by a vehicle; a matching result obtaining unit, configured to obtain a feature matching result of the face image and at least one pre-stored face image in a data set, where the data set stores a pre-stored face image of at least one registered driver; and an instruction sending unit, configured to send, if the feature matching result represents that the feature matching is successful, an instruction of allowing controlling the vehicle to the vehicle.

A driving management system provided according to yet another aspect of the embodiments of the present disclosure includes: at least one of a vehicle or a cloud server; the vehicle is configured to execute the driving management method according to any one of the foregoing embodiments; and the cloud server is configured to execute the driving management method according to any one of the foregoing embodiments.

Optionally, the system further includes: a mobile device, configured to: receive a driver registration request, the driver registration request including a registered face image of a driver; and send the driver registration request to the cloud server.

An electronic device provided according to yet another aspect of the embodiments of the present disclosure includes: a memory, configured to store an executable instruction; and a processor, configured to communicate with the memory to execute the executable instruction so as to complete the driving management method according to any one of the foregoing embodiments.

A computer program provided according to yet another aspect of the embodiments of the present disclosure includes: a computer readable code, where when the computer readable code runs in the electronic device, the processor in the electronic device executes to realize the driving management method according to any one of the foregoing embodiments.

A computer storage medium provided according to yet another aspect of the embodiments of the present disclosure for storing a computer readable instruction, where when the instruction is executed, the driving management method according to any one of the foregoing embodiments is realized.

Based on the driving management methods and systems, the vehicle-mounted intelligent systems, the electronic devices, and the medium provided by the foregoing embodiments of the present disclosure, by controlling a camera assembly provided on a vehicle to collect a video stream of a vehicle driver; obtaining a feature matching result of a face part of at least one image in the video stream and at least one pre-stored face image in a data set; and if the feature matching result represents that the feature matching is successful, controlling the vehicle to execute an operation instruction received by the vehicle, the dependence of the driver identification on a network is reduced, feature matching can be realized without the network, and thus, the safety guarantee of the vehicle is further improved.

The following further describes in detail the technical solutions of the present disclosure with reference to the accompanying drawings and embodiments.

BRIEF DESCRIPTION OF THE DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
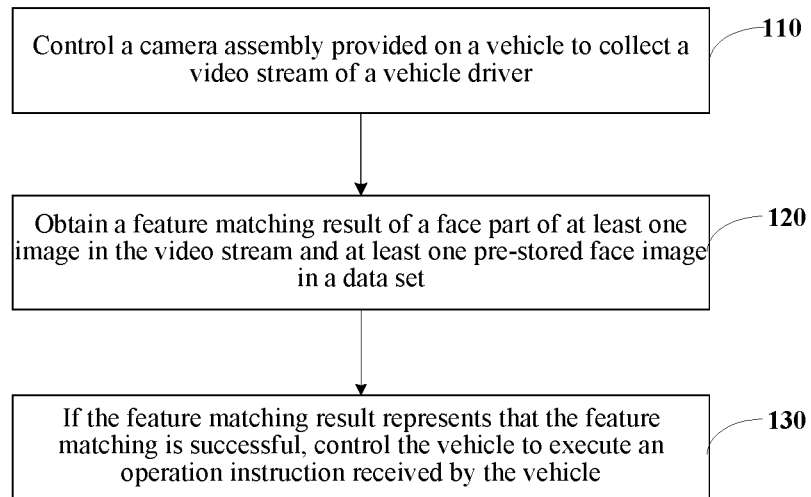
FIG. 1 is a flowchart of a driving management method according to some embodiments of the present disclosure.

Various exemplary embodiments of the present disclosure are now described in detail with reference to the accompanying drawings. It should be noted that, unless otherwise stated specifically, relative arrangement of the assemblies and steps, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like. It should be noted that the expression of "/" in the present disclosure represents the meaning of "or"; the expression of "A and/or B" in the present disclosure represents the meaning of "at least one of A or B".

The electronic devices such as terminal devices, computer systems, and servers may be described in the general context of computer system executable instructions (for example, program modules) executed by the computer system. Generally, the program modules may include routines, programs, target programs, assemblies, logics, data structures, and the like, to execute specific tasks or implement specific abstract data types. The computer system/server may be practiced in the distributed cloud computing environments in which tasks are executed by remote processing devices that are linked through a communications network. In the distributed computing environments, program modules may be located in local or remote computing system storage media including storage devices.

FIG. 1 is a flowchart of a driving management method according to some embodiments of the present disclosure. As shown in FIG. 1, the executive body of the driving management method of this embodiment may be a vehicle device, for example, the executive body may be a vehicle-mounted intelligent system or other devices having similar functions. The method of this embodiment includes the following operations.

110: Control a camera assembly provided on a vehicle to collect a video stream of a vehicle driver.

Optionally, in order to collect an image of a driver, the camera assembly is provided at a location where a driving seat can be photographed inside the vehicle, the location of the camera assembly may be fixed or movable. In a movable situation, the location of the camera assembly can be adjusted according to different drivers; and in a fixed situation, the lens direction of the camera assembly can be adjusted for different drivers.

In an optional example, the operation 110 may be executed by a processor by invoking a corresponding instruction stored in a memory, or may be executed by a video collection unit 71 run by the processor.

120: Obtain a feature matching result of a face part of at least one image in the video stream and at least one pre-stored face image in a data set.

Optionally, the data set stores a pre-stored face image of at least one registered driver, i.e., a face image corresponding to the registered driver is saved in the data set as the pre-stored face image.

Optionally, the face part in the image may be obtained by face detection (e.g., performing face detection based on a neural network); feature matching is performed on the face part and the pre-stored face image in the data set; and features of the face part and features of the pre-stored face image may be separately obtained by a convolutional neural network, and then feature matching is performed to identify the pre-stored face image corresponding to the same face as the face part, so as to realize identification of the identity of a driver with an image being collected.

In an optional example, the operation 120 may be executed by a processor by invoking a corresponding instruction stored in a memory, or may be executed by a result obtaining unit 72 run by the processor.

130: If the feature matching result represents that the feature matching is successful, control the vehicle to execute an operation instruction received by the vehicle.

Optionally, the feature matching result includes two situations: the feature matching is successful, and the feature matching is unsuccessful. When the feature matching is successful, it is r that the vehicle driver is a registered driver and can control the vehicle, and at this time, control the vehicle to execute the received operation instruction (an operation instruction sent by the driver).

In an optional example, the operation 130 may be executed by a processor by invoking a corresponding instruction stored in a memory, or may be executed by an operation unit 73 run by the processor.

Based on the driving management method provided by the foregoing embodiments of the present disclosure, by controlling a camera assembly provided on a vehicle to collect a video stream of a vehicle driver; obtaining a feature matching result of a face part of at least one image in the video stream and at least one pre-stored face image in a data set; and if the feature matching result represents that the feature matching is successful, controlling the vehicle to execute an operation instruction received by the vehicle, the dependence of the driver identification on a network is reduced, feature matching can be realized without the network, and thus, the safety guarantee of the vehicle is further improved.

In one or more optional embodiments, the driving management method further includes: when the vehicle and a cloud server are in a communication connection state, sending a data set download request to the cloud server; and receiving and storing the data set sent by the cloud server.

Optionally, the data set is generally saved in the cloud server. In this embodiment, the face matching is performed on the vehicle. In order to match the face without the network, a data set may be downloaded from the cloud server through the network, and the data set is saved on the vehicle. At this time, even if it is impossible to communicate with the cloud server without the network, face matching may also be realized on the vehicle, and the management of the data set by the vehicle is facilitated.

In one or more optional embodiments, the driving management method further includes: if the feature matching result represents that the feature matching is successful, obtaining identity information of the vehicle driver according to the pre-stored face image that is succeeded in feature matching; and sending the image and the identity information to the cloud server.

In this embodiment, when the feature matching is successful, it is indicated that the driver is a registered driver, corresponding identity information may be obtained from the data set. Moreover, for sending the image and the identity information to the cloud server, real-time tracing may be established on the driver by the cloud server (e.g., when and where does a driver drive a vehicle?). Because the image is obtained based on a video stream, the image is uploaded to the cloud server in real time in the presence of the network, to realize analysis, statistics, and/or management of the driver driving state.

In one or more optional embodiments, the driving management method may further include: if the feature matching result represents that the feature matching is successful, obtaining identity information of the vehicle driver according to the pre-stored face image that is succeeded in feature matching; intercepting the face part in the image; and sending the intercepted face part and the identity information to the cloud server.

Because the process of face matching is realized based on the face part in the image, in this embodiment, when the image is sent to the cloud server, the face part obtained based on image segmentation may only be sent, which is beneficial to reduce communication network overhead between the vehicle device and the cloud server; after the cloud server receives the intercepted face part and the identity information, the face part may be stored in the data set as a new face image of the driver by adding or replacing the existing face image to serve as the basis for the next face recognition.

In one or more optional embodiments, the driving management method may further include: obtaining a living body detection result of the collected image; operation 130 may include: controlling the vehicle to execute an operation instruction received by the vehicle according to the feature matching result and the living body detection result.

In this embodiment, the living body detection is used to determine whether the image is from a real person (i.e., a living body person), the authentication of the driver may be more accurate through the living body detection. This embodiment does not define the specific manner of the living body detection. For example, the living body detection may be realized by three-dimensional information depth analysis of images, facial optical flow analysis, Fourier spectrum analysis, edge or reflection anti-counterfeiting clue analysis, multi-frame video image frame synthesis analysis in video stream, and the like, and details are not described herein again.

Optionally, the pre-stored face image in the data set is also correspondingly provided with a driving permission; the driving management method may further include: if the feature matching result represents that the feature matching is successful, obtaining the driving permission corresponding to the pre-stored face image that is succeeded in feature matching; operation 130 may include: controlling the vehicle to execute an operation instruction received by the vehicle within the permission scope.

In this embodiment, by setting different driving permissions for different drivers to realize classified management, the safety of the vehicle can be improved, and the driver with higher permission can be guaranteed to have higher right of control, which can improve the user experience. Different permission settings can be distinguished by limiting the operating time and/or operating range. For example, some drivers with corresponding driving permissions can only drive in the daytime or at specific periods of time, while others with corresponding driving permissions can drive in the whole day, and the like; alternatively, some drivers with corresponding driving permissions may use in-vehicle entertainment devices when driving the vehicle, while other drivers with corresponding driving permissions may only drive the vehicle.

In one or more optional embodiments, the driving management method further includes: performing driver state detection based on the video stream; and performing early-warning prompt on an abnormal driving state and/or performing intelligent driving control according to the result of the driver state detection.

In some of the embodiments, the result of the driver state detection may be outputted.

In some other of the embodiments, the intelligent driving control may be performed on the vehicle according to the result of the driver state detection.

In still some of the embodiments, the result of the driver state detection may be outputted, and at the same time, the intelligent driving control may be performed on the vehicle according to the result of the driver state detection.

Optionally, the result of the driver state detection may be outputted locally, and/or the result of the driver state detection may be outputted remotely. The result of the driver state detection is output locally, i.e., the result of the driver state detection is output by a driver state detection device or a driver monitoring system, or the result of the driver state detection is output to a central control system in the vehicle, so that the intelligent driving control is performed on the vehicle based on the result of the driver state detection. The result of the driver state detection is output remotely, for example, the result of the driver state detection may be sent to the cloud server or a management node so that the cloud server or the management node may collect, analyze, and/or manage the result of the driver state detection by, or the vehicle is remotely controlled based on the result of the driver state detection.

In an optional example, performing early-warning prompt on an abnormal driving state and/or performing intelligent driving control according to the result of the driver state detection may be executed by a processor by invoking a corresponding instruction stored in a memory, or may be executed by an output module and/or an intelligent driving control module run by the processor.

In an optional example, the foregoing operation may be executed by a processor by invoking a corresponding instruction stored in a memory, or may be executed by a driver state detection unit run by the processor.

In some embodiments, the driver state detection, for example, may include, but is not limited to, at least one of: driver fatigue state detection, driver distraction state detection, driver's predetermined distraction action detection, and driver gesture detection, and thus, the result of the driver state detection correspondingly includes, but is not limited to, at least one of: the result of the driver fatigue state detection, the result of the driver distraction state detection, the result of the driver's predetermined distraction action detection, and the result of the driver gesture detection.

The predetermined distraction action in this embodiment may be any distraction action that may distract the driver, for example, a smoking action, a drinking action, an eating action, a calling action, an entertainment action and the like. The eating action is eating food, for example, fruit, snacks and the like. The entertainment action is any action executed with the aid of an electronic device, for example, sending messages, playing games, singing and the like. The electronic device is for example a mobile terminal, a handheld computer, a game machine and the like.

Based on the driver state detection method provided in the foregoing embodiment of the present disclosure, the driver state detection may be performed on the driver image, and the result of the driver state detection is output, to realize real-time detection of the driving state of the driver, so that corresponding measures are taken in time when the driving state of the driver is poor, to ensure safe driving and avoid road traffic accidents.

Figure 2:
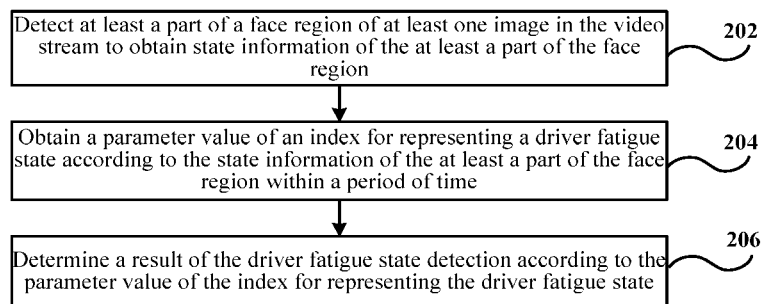
FIG. 2 is a flowchart of performing driver fatigue state detection based on a video stream according to some embodiments of the present disclosure.

FIG. 2 is a flowchart of performing driver fatigue state detection based on a video stream according to some embodiments of the present disclosure. In an optional example, the embodiment shown in FIG. 2 may be executed by a processor by invoking a corresponding instruction stored in a memory, or may be executed by a state detection unit run by the processor. As shown in FIG. 2, the method for performing driver fatigue state detection based on a video stream may include the following operations.

202: Detect at least a part of a face region of at least one image in the video stream to obtain state information of the at least a part of the face region.

In an optional example, the foregoing at least a part of the face region may include at least one of: a driver's eye region, a driver's mouth region, a driver's entire face region and the like. The state information of the at least a part of the face region may include at least one of: eye open/closed state information and mouth open/closed state information.

Optionally, the foregoing eye open/closed state information may be used for detecting eye closure of the driver, for example, whether the driver's eyes are semi-closed ("semi-" represents the state that the eyes are not completely closed, for example, squinted in the sleepy state and the like), whether the driver closes the eyes, the number of eye closures, the eye closure amplitude and the like. Optionally, the eye open/closed state information may be the information obtained by normalization processing of the amplitude of eye opening. Optionally, the foregoing mouth open/closed state information may be used for yawn detection of the driver, for example, detecting whether the driver yawns, and the number of yawns and the like. Optionally, the mouth open/closed state information may be the information obtained by normalization processing of the amplitude of mouth opening.

In an optional example, face key point detection may be performed on the driver image, and computation is performed directly using an eye key point in the detected face key points, to obtain the eye open/closed state information according to the computation result.

In an optional example, the eyes in the driver image are first positioned using the eye key point in the face key points (for example, the coordinate information of the eye key point in the driver image) to obtain an eye image, and an upper eyelid line and a lower eyelid line are obtained using the eye image; and the eye open/closed state information is obtained by computing the spacing between the upper eyelid line and the lower eyelid line.

In an optional example, computation is performed directly using a mouth key point in the face key points, so as to obtain the mouth open/closed state information according to the computation result.

In an optional example, the mouth in the driver image is first positioned using the mouth key point in the face key points (for example, the coordinate information of the mouth key point in the driver image) to obtain a mouth image through a mode such as shearing, and an upper lip line and a lower lip line are obtained using the mouth image; and the mouth open/closed state information is obtained by computing the spacing between the upper lip line and the lower lip line.

204: Obtain a parameter value of an index for representing a driver fatigue state according to the state information of the at least a part of the face region within a period of time.

In some optional examples, the index for representing the driver fatigue state for example may include, but is not limited to, at least one of: an eye closure degree and a yawning degree.

In an optional example, the parameter value of the eye closure degree for example may include, but is not limited to, at least one of: the number of eye closures, eye closure frequency, eye closure duration, eye closure amplitude, the number of eye semi-closures, and eye semi-closure frequency; and/or the parameter value of the yawning degree for example may include, but is not limited to, at least one of: a yawning state, the number of yawns, yawning duration, and yawning frequency.

206: Determine the result of the driver fatigue state detection according to the parameter value of the index for representing the driver fatigue state.

Optionally, the foregoing result of the driver fatigue state detection may include: fatigue state is not detected, and the fatigue driving state. Alternatively, the foregoing result of the driver fatigue state detection may also be the fatigue driving degree, where the fatigue driving degree may include: normal driving level (also called non-fatigue driving level) and fatigue driving level, where the fatigue driving level may be one level, or may be divided into multiple different levels, for example, the foregoing fatigue driving level may be divided into fatigue driving prompt level (also called mild fatigue driving level) and fatigue driving warning level (also called severe fatigue driving level); certainly, the fatigue driving degree may be divided into more levels, for example, mild fatigue driving level, moderate fatigue driving level, and severe fatigue driving level and the like. The present disclosure does not limit different levels included in the fatigue driving degree.

Figure 3:
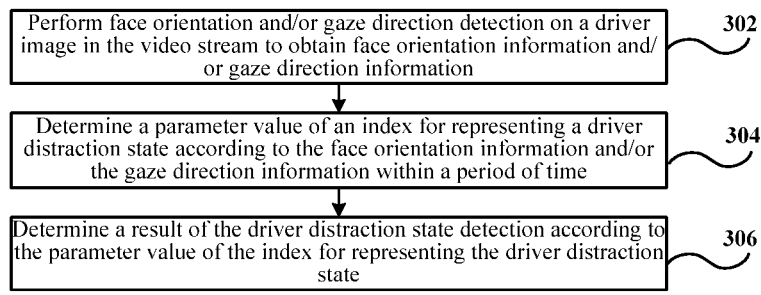
FIG. 3 is a flowchart of performing driver distraction state detection based on a video stream according to some embodiments of the present disclosure.

FIG. 3 is a flowchart of performing driver distraction state detection based on a video stream according to some embodiments of the present disclosure. In an optional example, the embodiment shown in FIG. 3 may be executed by a processor by invoking a corresponding instruction stored in a memory, or may be executed by a state detection unit run by the processor. As shown in FIG. 3, the method for performing driver distraction state detection based on a video stream may include the following operations.

302: Perform face orientation and/or gaze direction detection on the driver image in the video stream to obtain face orientation information and/or gaze direction information.

Optionally, the foregoing face orientation information may be used for determining whether the face direction of the driver is normal, for example, determining whether the driver turns his/her face or turns around and the like. Optionally, the face orientation information may be an included angle between the front of the face of the driver and the front of the vehicle driven by the driver. Optionally, the foregoing gaze direction information may be used for determining whether the gaze direction of the driver is normal, for example, determining whether the driver gazes ahead and the like. The gaze direction information may be used for determining whether a deviation phenomenon occurs to the gaze of the driver. Optionally, the gaze direction information may be an included angle between the gaze of the driver and the front of the vehicle driven by the driver.

304: Determine a parameter value of an index for representing a driver distraction state according to the face orientation information and/or the gaze direction information within a period of time.

In some optional examples, the index for representing the driver distraction state for example may include, but is not limited to, at least one of: a face orientation deviation degree and a gaze deviation degree. In an optional example, the parameter value of the face orientation deviation degree for example may include, but is not limited to, at least one of: the number of head turns, head turning duration, and head turning frequency; and/or the parameter value of the gaze deviation degree for example may include, but is not limited to, at least one of: a gaze direction deviation angle, gaze direction deviation duration, and gaze direction deviation frequency.

In an optional example, the foregoing gaze deviation degree for example may include: at least one of whether the gaze deviates, whether the gaze severely deviates and the like. The foregoing face orientation deviation degree (also called the face turning degree or the head turning degree) for example may include: at least one of whether the head turns, whether the head turns for a short time, and whether the head turns for a long time.

In an optional example, if it is determined that the face orientation information is larger than the first orientation, and the phenomenon of larger than the first orientation continues for N1 frames (for example, continuing for 9 frames, 10 frames or the like), it is determined that the driver has experienced a long-time large-angle head turning, and the long-time large-angle head turning can be recorded, or the duration of this head turning may be recorded; and if it is determined that the face orientation information is not larger than the first orientation but is larger than the second orientation, and the phenomenon of not larger than the first orientation but larger than the second orientation continues for N1 frame (for example, lasting for 9 frames, 10 frames or the like), it is determined that the driver has experienced a long-time small-angle head turning, and the long-time small-angle head turning can be recorded, or the duration of this head turning may be recorded.

In an optional example, if it is determined that the included angle between the gaze direction information and the front of the vehicle is greater than a first included angle, and the phenomenon of greater than the first included angle continues for N2 frame (for example, continuing for 8 frames, 9 frames or the like), it is determined that the driver has experienced a severe gaze deviation, and the severe gaze deviation can be recorded, or the duration of this severe gaze deviation can be recorded; and if it is determined that the included angle between the gaze direction information and the front of the vehicle is not greater than a first included angle but is greater than a second included angle, and the phenomenon of not greater than the first included angle but greater than the second included angle continues for N2 frame (for example, continuing for 8 frames, 9 frames or the like), it is determined that the driver has experienced a gaze deviation, and the gaze deviation can be recorded, or the duration of this gaze deviation can be recorded.

In an optional example, the values of the foregoing first orientation, second orientation, first included angle, second included angle, N1, and N2 may be set according to actual situations, and the present disclosure does not limit the values.

306: Determine the result of the driver distraction state detection according to the parameter value of the index for representing the driver distraction state.

Optionally, the result of the driver distraction state detection may include, for example, the driver's concentration (the driver's attention is not distracted), and the driver distraction; or the result of the driver distraction state detection may be the driver distraction level, for example, the driver's concentration (the driver's attention is not distracted), the driver's attention is slightly distracted, and the driver's attention is moderately distracted, the driver's attention is severely distracted and the like. The driver distraction level may be determined by a preset condition that the parameter value of the index for representing the driver distraction state satisfies. For example, if the gaze direction deviation angle and the face orientation deviation angle are both less than the first preset angle, the driver distraction level is the driver's concentration; if either of the gaze direction deviation angle and the face orientation deviation angle is greater than or equal to the preset angle, and the duration is greater than the first preset duration and less than or equal to the second preset duration, the driver's attention is slightly distracted; if either of the gaze direction deviation angle and the face orientation deviation angle is greater than or equal to the first preset angle, and the duration is greater than the second preset duration and less than or equal to the third preset duration, the driver's attention is moderately distracted; and if either of the gaze direction deviation angle and the face orientation deviation angle is greater than or equal to the first preset angle, and the duration is greater than the third preset duration, the driver's attention is severely distracted, where the first preset duration is less than the second preset duration, and the second preset duration is less than the third preset duration.

This embodiment determines the parameter value of the index for representing the driver distraction state by detecting the face orientation and/or gaze direction of the driver image, determines the result of the driver distraction state detection based on the parameter value to determine whether the driver concentrates on driving, quantizing the driving attention degree into at least one of the gaze deviation degree and the head turning degree through quantization of the index for representing the driver distraction state, which is beneficial to evaluate the driving attention state of the driver in time and objectively.

In some embodiments, the performing face orientation and/or gaze direction detection on the driver image in operation 302 may include: detecting face key points of the driver image in the video stream; and performing face orientation and/or gaze direction detection according to the face key points.

Since the face key points generally contain feature information of head posture, in some optional examples, the performing face orientation detection according to face key points to obtain the face orientation information includes: obtaining feature information of head posture according to the face key points; and determining the face orientation (also called head posture) information according to the feature information of the head posture; the face orientation information herein may represent, for example, the direction and angle of face turning, and the turning direction herein may be turn to the left, turn to the right, turn down, and/or turn up and the like.

In an optional example, whether the driver concentrates on driving can be determined through face orientation. The face orientation (head posture) may be represented as (yaw, pitch), where yaw separately represents a horizontal deflection angle (a yaw angle) and a vertical deflection angle (a pitch angle) of the head in the normalized spherical coordinates (a camera coordinate system where a camera is located). When the horizontal deflection angle and/or the vertical deflection angle are greater than a preset angle threshold, and the duration is greater than a preset time threshold, it can be determined that the result of the driver distraction state detection is distracted.

In an optional example, a corresponding neural network may be used to obtain the face orientation information of at least one driver image. For example, the foregoing detected face key points are input to a first neural network, the feature information of the head posture is extracted via the first neural network based on the received face key points and is input to a second neural network; and head posture estimation is performed via the second neural network based on the feature information of the head posture to obtain the face orientation information.

In the case of using a neural network that is relatively mature and has good real-time characteristics for extracting the feature information of the head posture, and a neural network for estimating the face orientation to obtain the face orientation information, a video captured by the camera can detect the face orientation information corresponding to at least one image frame (i.e., at least one driver image) in the video accurately and in time, thus improving the accuracy of determining the driver's attention degree.

In some optional examples, the performing gaze direction detection according to face key points to obtain the gaze direction information includes: determining a pupil edge location according to an eye image positioned by an eye key point in the face key points, and computing a pupil center location according to the pupil edge location; and computing the gaze direction information according to the pupil center location and an eye center location, for example, computing vectors of the pupil center location and the eye center location in the eye image, the vectors being the gaze direction information.

In an optional example, whether the driver concentrates on driving can be determined through the gaze direction. The gaze direction may be represented as (yaw, pitch), where yaw separately represents a horizontal deflection angle (a yaw angle) and a vertical deflection angle (a pitch angle) of the gaze in the normalized spherical coordinates (a camera coordinate system where a camera is located). When the horizontal deflection angle and/or the vertical deflection angle is greater than a preset angle threshold, and the duration is greater than a preset duration threshold, it can be determined that the result of the driver distraction state detection is distracted.

In an optional example, the determining the pupil edge location according to an eye image positioned by an eye key point in the face key points may be realized in the following mode: detecting, based on a third neural network, a pupil edge location of an eye region image in the images divided according to the face key points, and obtaining the pupil edge location according to information output by the third neural network.

Figure 4:
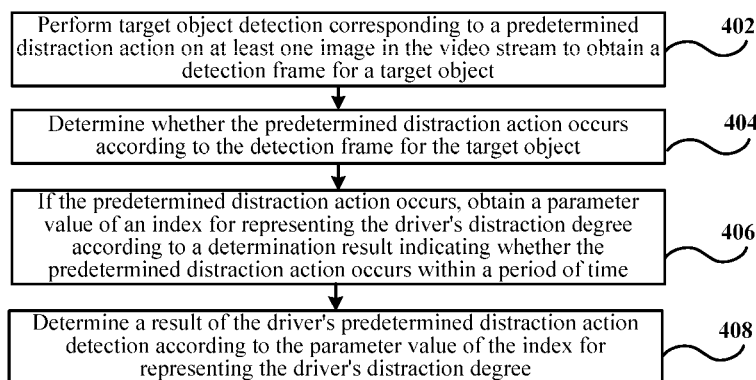
FIG. 4 is a flowchart of performing driver's predetermined distraction action detection based on a video stream according to some embodiments of the present disclosure.

FIG. 4 is a flowchart of performing driver's predetermined distraction action detection based on a video stream according to some embodiments of the present disclosure. In an optional example, the embodiment shown in FIG. 4 may be executed by the processor by invoking a corresponding instruction stored in a memory, or may be performed by a state detection unit run by the processor. As shown in FIG. 4, the method for performing driver's predetermined distraction action detection based on a video stream may include the following operations.

402: Perform target object detection corresponding to the predetermined distraction action on at least one image in the video stream to obtain a detection frame for a target object.

404: Determine whether the predetermined distraction action occurs according to the detection frame for the target object.

In this embodiment, the predetermined distraction action detection is performed on the driver. By detecting the target object corresponding to the predetermined distraction action and determining whether the distraction action occurs according to the detection frame for the detected target object, whether the driver is distracted can be determined, which is contributive to obtain the accurate result of the driver's predetermined distraction action detection so as to improve the accuracy of the result of the driver state detection.

For example, when the predetermined distraction action is a smoking action, the foregoing operations 402-404 may include: performing face detection on the driver image via a fourth neural network to obtain a face detection frame, and extracting feature information of the face detection frame; and determining whether the smoking action occurs via the fourth neural network according to the feature information of the face detection frame.

For another example, when the predetermined distraction action is an eating action/drinking action/calling action/entertainment action (i.e., an eating action and/or a drinking action and/or a calling action and/or an entertainment action), the foregoing operations 402-404 may include: performing preset target object detection corresponding to the eating action/drinking action/calling action/entertainment action on the driver image via a fifth neural network to obtain a detection frame for preset target objects, where the preset target objects include: hands, mouth, eyes, and a target item; the target item for example may include, but is not limited to, at least one types: containers, foods, and electronic devices; determining the result of the predetermined distraction action detection according to the detection frame for the preset target objects, the result of the predetermined distraction action detection including one of: no eating action/drinking action/calling action/entertainment action occurs, the eating action occurs, the drinking action occurs, the calling action occurs, and the entertainment action occurs.

In some optional examples, when the predetermined distraction action is an eating action/drinking action/calling action/entertainment action (i.e., an eating action and/or a drinking action and/or a calling action and/or an entertainment action), the determining a detection result of the predetermined distraction action according to the detection frame for the preset target objects may include: determining the result of the predetermined distraction action detection according to whether a detection frame for the hands, a detection frame for the mouth, a detection frame for the eyes, and a detection frame for the target item are detected, and according to whether the detection frame for the hands overlaps the detection frame for the target item, the type of the target item, and whether the distance between the detection frame for the target item and the detection frame for the mouth or the detection frame for the eyes satisfies preset conditions.

Optionally, if the detection frame for the hands overlaps the detection frame for the target item, the type of the target item is a container or food, and the detection frame for the target item overlaps the detection frame for the mouth, it is determined that the eating action or the drinking action occurs; and/or if the detection frame for the hands overlaps the detection frame for the target item, the type of the target item is an electronic device, and the minimum distance between the detection frame for the target item and the detection frame for the mouth is less than a first preset distance, or the minimum distance between the detection frame for the target item and the detection frame for the eyes is less than a second preset distance, it is determined that the entertainment action or the calling action occurs.

In addition, if the detection frame for the hands, the detection frame for the mouth, and the detection frame for any one of the target items are not detected simultaneously, and the detection frame for the hands, the detection frame for the eyes, and the detection frame for any one of the target items are not detected simultaneously, it is determined that the result of the distraction action detection is that no eating action, drinking action, calling action, and entertainment action is detected; and/or if the detection frame for the hands does not overlap the detection frame for the target item, it is determined that the result of the distraction action detection is that no eating action, drinking action, calling action, and entertainment action is detected; and/or if the type of the target item is a container or food, and the detection frame for the target item does not overlap the detection frame for the mouth, and/or the type of the target item is electronic device, and the minimum distance between the detection frame for the target item and the detection frame for the mouth is not less than the first preset distance, or the minimum distance between the detection frame for the target item and the detection frame for the eyes is not less than the second preset distance, it is determined that the result of the distraction action detection is that no eating action, drinking action, calling action, and entertainment action is detected.

In addition, the foregoing embodiment of performing predetermined distraction action detection on the driver image may further include: if the result of the driver's predetermined distraction action detection is that a predetermined distraction action is detected, prompting the detected predetermined distraction action, for example, when the smoking action is detected, prompting the detection of smoking; when the drinking action is detected, prompting the detection of drinking; and when the calling action is detected, prompting the detection of calling.

In an optional example, the foregoing operations of prompting the detected predetermined distraction actions may be executed by a processor by invoking a corresponding instruction stored in a memory, or may be executed by a prompt module run by the processor.

In addition, with reference to FIG. 4 again, another embodiment of performing driver's predetermined distraction action detection on the driver image may also selectively include:

406: If the predetermined distraction action occurs, obtain a parameter value of an index for representing the driver's distraction degree according to a determination result indicating whether the predetermined distraction action occurs within a period of time.

Optionally, the index for representing driver distraction degree for example may include, but is not limited to, at least one of: the number of occurrences of the predetermined distraction action, duration of the predetermined distraction action, and frequency of the predetermined distraction action, e.g., the number of occurrences of the smoking action, the duration of the smoking action, and the frequency of the smoking action; the number of occurrences of the drinking action, the duration of the drinking action, and the frequency of the drinking action; the number of occurrences of the calling action, the duration of the calling action, and the frequency of the calling action, and the like.

408: Determine the result of the driver's predetermined distraction action detection according to the parameter value of the index for representing the driver's distraction degree.

Optionally, the foregoing result of the driver's predetermined distraction action detection may include: the predetermined distraction action is not detected, and the predetermined distraction action is detected. In addition, the foregoing result of the driver's predetermined distraction action detection may also be the distraction level, for example, the foregoing distraction level may for example be divided into: non-distraction level (also called concentrated driving level), distraction driving prompt level (also called mild distraction driving level), and distraction driving warning level (also called severe distraction driving level); certainly, the distraction level may also be divided into more levels, for example, non-distraction level driving, mild distraction driving level, moderate distraction driving level, severe distraction driving level and the like. Certainly, the distraction level in at least one embodiment of the present disclosure may also be divided according to other situations which are not limited the foregoing level division situation.

In an optional example, the distraction level may be determined by a preset condition that the parameter value of the index for representing the distraction degree satisfies. For example, if the predetermined distraction action is not detected, the distraction level is the non-distraction level (also called concentrated driving level); if it is detected that the duration of the predetermined distraction action is less than a first preset duration, and the frequency is less than a first preset frequency, the distraction level is the mild distraction driving level; and if it is detected that the duration of the predetermined distraction action is greater than the first preset duration, and/or the frequency is greater than the first preset frequency, the distraction level is the severe distraction driving level.

In some embodiments, the driver state detection method may further include: outputting distraction prompt information according to the result of the driver distraction state detection and/or the result of the driver's predetermined distraction action detection.

Optionally, if the result of the driver distraction state detection is the driver distraction, or the driver distraction level, and/or the result of the driver's predetermined distraction action detection is that the predetermined distraction action is detected, the distraction prompt information may be outputted to remind the driver of concentration on driving.

In an optional example, the foregoing operation of outputting the distraction prompt information according to the result of the driver distraction state detection and/or the result of the driver's predetermined distraction action detection may be executed by a processor by invoking a corresponding instruction stored in a memory, or may be executed by a prompt unit run by the processor.

Figure 5:
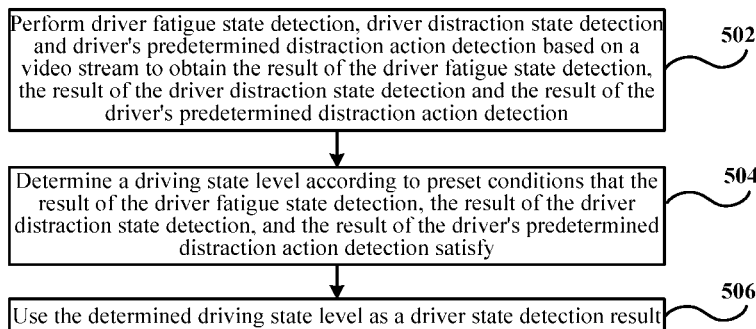
FIG. 5 is a flowchart of a driver state detection method according to some embodiments of the present disclosure.

FIG. 5 is a flowchart of the driver state detection method according to some embodiments of the present disclosure. In an optional example, the embodiment shown in FIG. 5 may be executed by a processor by invoking a corresponding instruction stored in a memory, or may be executed by a state detection unit run by the processor. As shown in FIG. 5, the driver state detection method according to the embodiment includes the following operations.

502: Perform driver fatigue state detection, driver distraction state detection and driver's predetermined distraction action detection based on a video stream to obtain the result of the driver fatigue state detection, the result of the driver distraction state detection and the result of the driver's predetermined distraction action detection.

504: Determine a driving state level according to preset conditions that the result of the driver fatigue state detection, the result of the driver distraction state detection, and the result of the driver's predetermined distraction action detection satisfy.

506: Use the determined driving state level as the driver state detection result.

In an optional example, each driving state level corresponds to a preset condition; the preset conditions that the result of the driver fatigue state detection, the result of the driver distraction state detection and the result of the driver's predetermined distraction action detection satisfy may be determined in real time; and the driving state level corresponding to the satisfied preset condition may be determined as the driver state detection result of the driver, where the driving state level for example may include: the normal driving state (also called concentrated driving level), the driving prompt state (the driving state is poor), and the driving warning state (the driving state is very poor).

In an optional example, the foregoing embodiment shown in FIG. 5 may be executed by a processor by invoking a corresponding instruction stored in a memory, or may be executed by an output module run by the processor.

For example, the preset condition corresponding to the normal driving level (also called concentrated driving level) may include: condition 1: the result of the driver fatigue state detection is: the fatigue state is not detected, or non-fatigue driving level; condition 2: the result of the driver distraction state detection is: the driver concentrates on driving; and condition 3: the result of the driver's predetermined distraction action detection is: the predetermined distraction action is not detected, or the non-distraction level.

In the case that the foregoing conditions 1, 2, and 3 are all satisfied, the driving state level is the normal driving state (also called concentrated driving level).

For example, the preset condition corresponding to the driving prompt state (the driving state is poor) may include: condition 11: the result of the driver fatigue state detection is: the fatigue driving prompt level (also called the mild fatigue driving level); condition 22: the result of the driver distraction state detection is: the driver's attention is slightly distracted; and condition 33: the result of the driver's predetermined distraction action detection is: the distraction driving prompt level (also called the mild distraction driving level).

In the case that any one of the foregoing conditions 11, 22, and 33 is satisfied, and the results in the other conditions do not reach the preset conditions corresponding to the more severe fatigue driving level, the attention distraction level, and the distraction level, the driving state level is the driving prompt state (the driving state is poor).

For example, the preset condition corresponding to the driving warning level (the driving level is very poor) may include: condition 111: the result of the driver fatigue state detection is: the fatigue driving warning level (also called the severe fatigue driving level); condition 222: the result of the driver distraction state detection is: the driver's attention is severely distracted; and condition 333: the result of the driver's predetermined distraction action detection is: the distraction driving warning level (also called the severe distraction driving level).

In the case that any one of the foregoing conditions 111, 222, and 333 is satisfied, the driving state level is the driving warning state (the driving state is very poor).

In some embodiments, the driver state detection method may further include: executing a control operation corresponding to the result of the driver state detection.

In an optional example, the executing a control operation corresponding to the result of the driver state detection may be executed by a processor by invoking a corresponding instruction stored in a memory, or may be executed by a control unit run by the processor.

Optionally, the executing a control operation corresponding to the result of the driver state detection may include at least one of: if the determined result of the driver state detection satisfies a predetermined prompt/warning condition, e.g., satisfying a preset condition corresponding to the driving prompt state (the driving state is poor) or the driving state level is the driving prompt state (the driving state is poor), outputting prompt/warning information corresponding to the predetermined prompt/warning condition, e.g., prompting the driver with sound (e.g., voice or ringing, and the like)/light (e.g., light up or light flickering, and the like)/vibration and the like to call for attention of the driver so that the driver returns the distracted attention to driving or takes a rest, thereby realizing safe driving and avoiding road traffic accidents; and/or if the determined result of the driver state detection satisfies a predetermined driving mode switching condition, e.g., satisfying a preset condition corresponding to the driving warning state (the driving state is very poor), or the driving state level is the distraction driving warning level (also called the severe fatigue driving level), switching the driving mode to an automatic driving mode to realize safe driving and avoid road traffic accidents; and moreover, prompting the driver with sound (e.g., voice or ringing and the like)/light (e.g., light up or light flickering and the like)/vibration and the like to call for attention of the driver so that the driver returns the distracted attention to driving or takes a rest; and/or if the determined result of the driver state detection satisfies a predetermined information sending condition, sending predetermined information to a predetermined contact or establishing a communication connection to the predetermined contact, for example, it is agreed that when the driver makes certain or some actions, it is indicated that the driver is in a dangerous state or needs help; when these actions are detected, sending the predetermined information (e.g., alarm information, prompt information or dial-up call) to the predetermined contact (for example, alarm call, recent contact's call or the set emergency contact's phone), and establishing a communication connection (e.g., video call, voice call or phone call) to the predetermined contact directly through the vehicle-mounted device to guarantee the driver's personal and/or property safety.

In one or more optional embodiments, the driver state detection method may further include: sending at least a part of the result of the driver state detection to the cloud server.

Optionally, the at least a part of the result includes abnormal driving state information determined according to the driver state detection.

In this embodiment, sending some or all results obtained by driver state detection to the cloud server may realize backup of the abnormal driving state information. Since it does not need to record the normal driving state, this embodiment only sends the abnormal driving state information to the cloud server. When the obtained result of the driver state detection includes normal driving state information and abnormal driving state information, some results are transmitted, i.e., only the abnormal driving state information is sent to the cloud server. Moreover, when all results of the driver state detection are abnormal driving state information, all abnormal driving state information is sent to the cloud server.

Optionally, the driver state detection method may further include: storing images or video clips in the video stream corresponding to the abnormal driving state information in a vehicle; and/or, sending the images or video clips in the video stream corresponding to the abnormal driving state information to the cloud server.

In this embodiment, by saving the images or video clips corresponding to the abnormal driving state information locally at the vehicle, the evidence can be saved; according to the saved images or video clips, if the driving safety or other problems occurs due to the driver's abnormal driving state, responsibility determination may be performed by invoking the images or video clips; and if the abnormal driving state related to the problem is found in the saved images or video clips, the responsibility of the driver can be determined. Moreover, in order to prevent data on the vehicle from being accidentally deleted or deliberately deleted, the images or video clips corresponding to the abnormal driving state information may be uploaded to the cloud server for backup. When the information is needed, the images or video clips may be downloaded from the cloud server to the vehicle for viewing, or be downloaded from the cloud server to other clients for viewing.

In one or more optional embodiments, the driving management method further includes: when the vehicle and a mobile device are in a communication connection state, sending a data set download request to the mobile device; and receiving and storing the data set sent by the mobile device.

The data set is obtained from the cloud server and sent to the vehicle by the mobile device upon reception of the data set download request.

Optionally, the mobile device may be a mobile phone, a PAD, or other terminal devices on the vehicle. Upon reception of the data set download request, the mobile device sends the data set download request to the cloud server, and then obtains the data set to be sent to the vehicle. When the mobile device downloads the data set, the built-in network of the mobile device (e.g., 2G network, 3G network, 4G network, and the like) may be applied, avoiding the problem that the vehicle cannot download the data set from the cloud server without network and cannot perform face matching.

In one or more optional embodiments, the driving management method further includes: if the feature matching result represents that the feature matching is unsuccessful, refusing to execute the received operation instruction.

In this embodiment, the unsuccessful feature matching represents that the driver is not registered, and at this time, in order to guarantee the rights of the registered drivers, the vehicle refuses to execute the operation instruction of the driver.

Optionally, the driving management method further includes: sending registration prompt information; receiving a driver registration request according to the registration prompt information, the driver registration request including registered face images of the driver; and establishing a data set according to the registered face images.

In this embodiment, a driver registration request sent by the driver is received by the vehicle, the registered face images of the driver are saved, a data set is established based on the registered face images at the vehicle, and individual face matching of the vehicle is realized through the data set, without downloading the data set from the cloud server.

Figure 6:
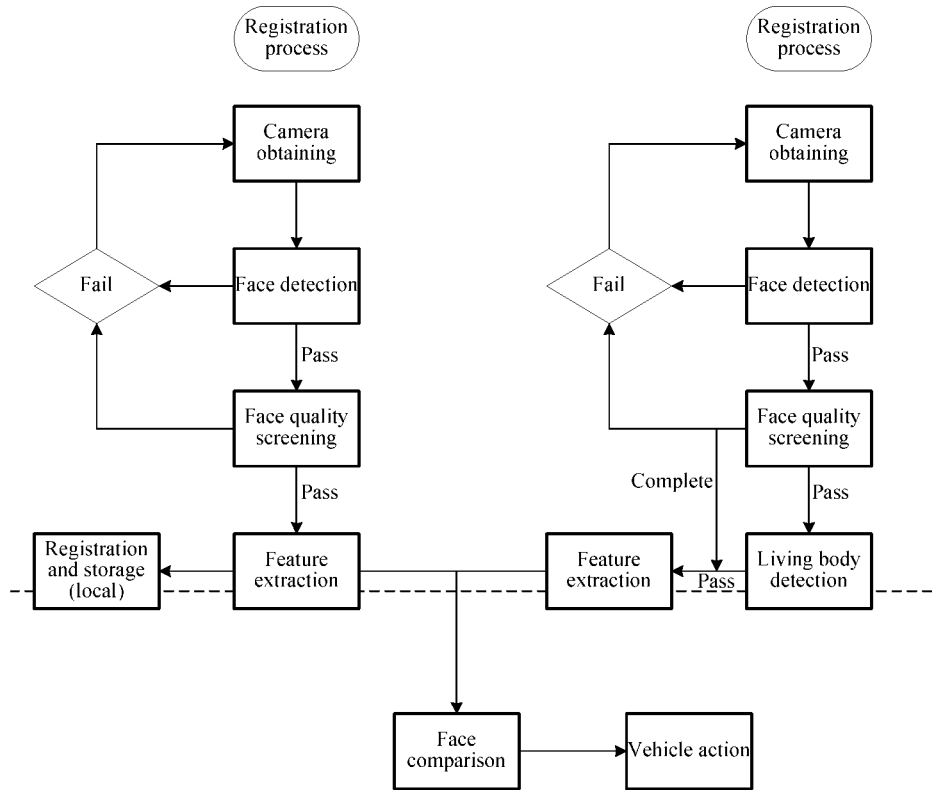
FIG. 6 is a flowchart of an application example of the driving management method according to some embodiments of the present disclosure.

FIG. 6 is a flowchart of an application example of the driving management method according to some embodiments of the present disclosure. As shown in FIG. 6, the executive body of the driving management method of this embodiment may be a vehicle device, for example, the executive body may be a vehicle-mounted intelligent system or other devices having similar function, and allocates corresponding driver permission information to the screened face image and driver ID information (identity information) and then stores same into the data set.

A vehicle client obtains a driver image, performs face detection, quality screening and living body identification on the driver image in sequence, and matches the screened to-be-identified face image with all face images in the data set; the matching is realized based on the face feature; the face feature is extracted by the neural network; the permission information corresponding to the to-be-identified face image is determined based on the comparison result; and the vehicle action is controlled based on the permission information. The vehicle client performs feature extraction on the to-be-identified image and the face image in the data set separately to obtain a corresponding face feature; matching is performed based on the face feature; and corresponding operation is executed based on the matching result.

In one or more optional embodiments, operation 120 may include: when the vehicle and the cloud server are in a communication connection state, uploading the face part of at least one image in the video stream to the cloud server, and receiving the feature matching result sent by the cloud server.

In this embodiment, performing feature matching in the cloud server is realized; before matching, the vehicle uploads the face part of at least one image in the video stream to the cloud server; the cloud server performs feature matching on the face part and the face image in the data set to obtain the feature matching result; the vehicle obtains the feature matching result from the cloud server, reducing the data traffic between the vehicle and the cloud server and reducing the network overhead.

A person of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method is executed. Moreover, the foregoing storage medium includes various media capable of storing program codes such as ROM, RAM, a magnetic disk, or an optical disk.

Figure 7:
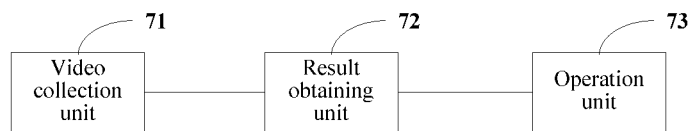
FIG. 7 is a schematic structural diagram of a vehicle-mounted intelligent system according to some embodiments of the present disclosure.

FIG. 7 is a schematic structural diagram of a vehicle-mounted intelligent system according to some embodiments of the present disclosure. The vehicle-mounted intelligent system according to some embodiment may be used for realizing each embodiment of the foregoing driving management method of the present disclosure. As shown in FIG. 7, the vehicle-mounted intelligent system according to some embodiment includes: a video collection unit 71, configured to control a camera assembly provided on a vehicle to collect a video stream of a vehicle driver; a result obtaining unit 72, configured to obtain a feature matching result of a face part of at least one image in the video stream and at least one pre-stored face image in a data set, optionally, the data set stores a pre-stored face image of at least one registered driver; and an operation unit 73, configured to control, if the feature matching result represents that the feature matching is successful, the vehicle to execute an operation instruction received by the vehicle.

Based on the vehicle-mounted intelligent system provided by the foregoing embodiment of the present disclosure, by controlling a camera assembly provided on a vehicle to collect a video stream of a vehicle driver; obtaining a feature matching result of a face part of at least one image in the video stream and at least one pre-stored face image in a data set; and if the feature matching result represents that the feature matching is successful, controlling the vehicle to execute an operation instruction received by the vehicle, the dependence of the driver identification on a network is reduced, feature matching can be realized without the network, and thus, the safety guarantee of the vehicle is further improved.

In one or more optional embodiments, the vehicle-mounted intelligent system further includes: a first data download unit, configured to send, when the vehicle and a cloud server are in a communication connection state, a data set download request to the cloud server; and a data storage unit, configured to receive and store the data set sent by the cloud server.

In one or more optional embodiments, the vehicle-mounted intelligent system further includes: a first cloud storage unit, configured to obtain, if the feature matching result represents that the feature matching is successful, identity information of the vehicle driver according to the pre-stored face image that is succeeded in feature matching, and send the image and the identity information to the cloud server.

In one or more optional embodiments, the vehicle-mounted intelligent system may further include: a second cloud storage unit, configured to obtain, if the feature matching result represents that the feature matching is successful, identity information of the vehicle driver according to the pre-stored face image that is succeeded in feature matching; intercept the face part in the image; and send the intercepted face part and the identity information to the cloud server.

In one or more optional embodiments, the vehicle-mounted intelligent system may further include: a living body detection unit, configured to obtain a living body detection result of the collected image.

The operation unit 73 is configured to control the vehicle to execute an operation instruction received by the vehicle according to the feature matching result and the living body detection result.

Optionally, the pre-stored face image in the data set is also correspondingly provided with a driving permission.

The system of this embodiment may further include: a permission obtaining unit, configured to obtain, if the feature matching result represents that the feature matching is successful, the driving permission corresponding to the pre-stored face image that is succeeded in feature matching.

The operation unit 73 is further configured to control the vehicle to execute an operation instruction received by the vehicle within the permission scope.

In one or more optional embodiments, the vehicle-mounted intelligent system further includes: a state detection unit, configured to perform driver state detection based on the video stream; an output unit, configured to perform early-warning prompt on an abnormal driving state according to the result of the driver state detection; and/or an intelligent driving control unit, configured to perform intelligent driving control according to the result of the driver state detection.

In some of the embodiments, the result of the driver state detection of the driver may be outputted.

In some other of the embodiments, the intelligent driving control may be performed on the vehicle according to the result of the driver state detection.

In still some of the embodiments, the result of the driver state detection may be outputted, and at the same time, the intelligent driving control may be performed on the vehicle according to the result of the driver state detection.

Optionally, the driver state detection includes at least one of: driver fatigue state detection, driver distraction state detection, driver's predetermined distraction action detection, and driver gesture detection.

Optionally, the state detection unit is configured, when performing driver fatigue state detection based on the video stream, to: detect at least a part of a face region of at least one image in the video stream to obtain state information of the at least a part of the face region, the state information of the at least a part of the face region including at least one of: eye open/closed state information and mouth open/closed state information; obtain a parameter value of an index for representing a driver fatigue state according to the state information of the at least a part of the face region within a period of time; and determine the result of the driver fatigue state detection according to the parameter value of the index for representing the driver fatigue state.

Optionally, the index for representing the driver fatigue state includes at least one of: an eye closure degree and a yawning degree.

Optionally, the parameter value of the eye closure degree includes at least one of: the number of eye closures, eye closure frequency, eye closure duration, eye closure amplitude, the number of eye semi-closures, and eye semi-closure frequency; and/or, the parameter value of the yawning degree includes at least one of: a yawning state, the number of yawns, yawn duration, and yawning frequency.

In one or more optional embodiments, the state detection unit is configured, when performing driver distraction state detection based on the video stream, to: perform face orientation and/or gaze direction detection on the driver image in the video stream to obtain face orientation information and/or gaze direction information; determine a parameter value of an index for representing a driver distraction state according to the face orientation information and/or the gaze direction information within a period of time, the index for representing the driver distraction state includes at least one of: a face orientation deviation degree and a gaze deviation degree; and determine the result of the driver distraction state detection according to the parameter value of the index for representing the driver distraction state.

Optionally, the parameter value of the face orientation deviation degree includes at least one of: the number of head turns, head turn duration, and head turn frequency; and/or, the parameter value of the gaze deviation degree includes at least one of: a gaze direction deviation angle, gaze direction deviation duration, and gaze direction deviation frequency.

Optionally, the state detection unit is configured, when performing face orientation and/or gaze direction detection on the driver image in the video stream, to: detect face key points of the driver image in the video stream; and perform face orientation and/or gaze direction detection according to the face key points.

Optionally, the state detection unit is configured, when performing face orientation detection according to the face key points, to: obtain feature information of head posture according to the face key points; and determine the face orientation information according to the feature information of the head posture.

Optionally, the predetermined distraction action includes at least one of: a smoking action, a drinking action, an eating action, a calling action, and an entertainment action.

In one or more optional embodiments, the state detection unit is configured, when performing driver's predetermined distraction action detection based on the video stream, to: perform target object detection corresponding to the predetermined distraction action on at least one image in the video stream to obtain a detection frame for a target object; and determine whether the predetermined distraction action occurs according to the detection frame for the target object.

Optionally, the state detection unit is further configured to: if the predetermined distraction action occurs, obtain a parameter value of an index for representing the distraction degree according to a determination result indicating whether the predetermined distraction action occurs within a period of time; and determine the result of the driver's predetermined distraction action detection according to the parameter value of the index for representing the driver's distraction degree.

Optionally, the parameter value of the index for representing the distraction degree includes at least one of: the number of occurrences of the predetermined distraction action, duration of the predetermined distraction action, and frequency of the predetermined distraction action.

Optionally, the vehicle-mounted intelligent system further includes: a prompt unit, configured to prompt, if the result of the driver's predetermined distraction action detection is that a predetermined distraction action is detected, the detected distraction action.

Optionally, the vehicle-mounted intelligent system further includes: a control unit, configured to execute a control operation corresponding to the result of the driver state detection.

Optionally, the control unit is configured to: if the determined result of the driver state detection satisfies a predetermined prompt/warning condition, output prompt/warning information corresponding to the predetermined prompt/warning condition; and/or, if the determined result of the driver state detection satisfies a predetermined information sending condition, send predetermined information to a predetermined contact or establish a communication connection to the predetermined contact; and/or, if the determined result of the driver state detection satisfies a predetermined driving mode switching condition, switch the driving mode to an automatic driving mode.

In one or more optional embodiments, the vehicle-mounted intelligent system further includes: a result sending unit, configured to send at least a part of the result of the driver state detection to the cloud server.

Optionally, the at least a part of the result includes abnormal driving state information determined according to the driver state detection.

Optionally, the vehicle-mounted intelligent system further includes: a video storage unit, configured to: store images or video clips in the video stream corresponding to the abnormal driving state information; and/or, send the images or video clips in the video stream corresponding to the abnormal driving state information to the cloud server.

In one or more optional embodiments, the vehicle-mounted intelligent system further includes: a second data download unit, configured to send, when the vehicle and a mobile device are in a communication connection state, a data set download request to the mobile device; and receive and store the data set sent by the mobile device.

Optionally, the data set is obtained from the cloud server and sent to the vehicle by the mobile device upon reception of the data set download request.

In one or more optional embodiments, the operation unit 73 is further configured to refuse to, if the feature matching result represents that the feature matching is unsuccessful, execute the received operation instruction.

Optionally, the operation unit 73 is further configured to: send registration prompt information; receive a driver registration request according to the registration prompt information, the driver registration request including registered face images of the driver; and establish a data set according to the registered face images.

In one or more optional embodiments, the result obtaining unit 72 is configured to upload, when the vehicle device and the cloud server are in a communication connection state, the face part of at least one image in the video stream to the cloud server, and receive the feature matching result sent by the cloud server.

For the working process and the setting manner of any embodiment of the vehicle-mounted intelligent system provided by the embodiments of the present disclosure, reference may be made to the specific description of the corresponding method embodiment of the present disclosure, and details are not described herein again due to space limitation.

Figure 8:
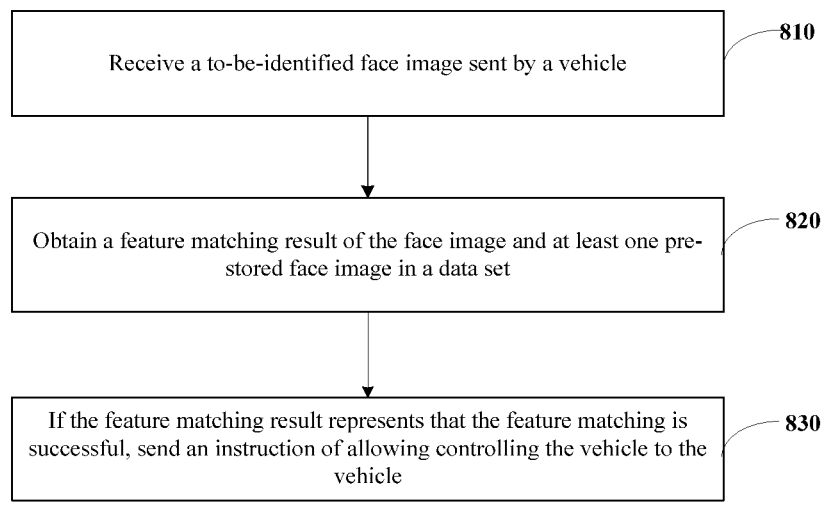
FIG. 8 is a flowchart of a driving management method according to some other embodiments of the present disclosure.

FIG. 8 is a flowchart of the driving management method according to some other embodiments of the present disclosure. As shown in FIG. 8, the executive body of the driving management method of this embodiment may be a cloud server, for example, the executive body may be an electronic device or other devices having similar function. The method of this embodiment includes the following operations.

810: Receive a to-be-identified face image sent by a vehicle.

Optionally, the to-be-identified face image is collected by the vehicle, and the face image is obtained from images in the collected video via face detection. The process of obtaining the face image based on the images in the video may include: face detection, face quality screening, and living body identification. These processes can ensure that the obtained to-be-identified face image is a face image of better quality of a real driver in the vehicle, ensuring the subsequent feature matching result.

In an optional example, the operation 810 may be executed by a processor by invoking a corresponding instruction stored in a memory, or may be executed by an image receiving unit 91 run by the processor.

820: Obtain a feature matching result of the face image and at least one pre-stored face image in a data set.

Optionally, the data set stores a pre-stored face image of at least one registered driver. Optionally, the cloud server may directly obtain the feature matching result from the vehicle, and at this time, the process of feature matching is realized at the vehicle.

Optionally, a feature matching result of the face image and at least one pre-stored face image in a data set is obtained from the vehicle.

In an optional example, the operation 820 may be executed by a processor by invoking a corresponding instruction stored in a memory, or may be executed by a matching result obtaining unit 92 run by the processor.

830: If the feature matching result represents that the feature matching is successful, send an instruction of allowing controlling the vehicle to the vehicle.

In an optional example, the operation 830 may be executed by a processor by invoking a corresponding instruction stored in a memory, or may be executed by an instruction sending unit 93 run by the processor.

Based on the driving management method provided by the foregoing embodiment of the present disclosure, by realizing face feature matching at the vehicle, the dependence of the driver identification on a network is reduced, feature matching can be realized without the network, and thus, the safety guarantee of the vehicle is further improved.

Optionally, the driving management method further includes: receiving a data set download request sent by the vehicle, the data set storing a pre-stored face image of at least one registered driver; and sending the data set to the vehicle.

Optionally, the data set is generally saved in the cloud server. In this embodiment, the face matching is performed on the vehicle. In order to match the face without the network, a data set may be downloaded from the cloud server through the network, and the data set is saved on the vehicle. At this time, even if it is impossible to communicate with the cloud server without the network, face matching may also be realized on the vehicle, and the management of the data set by the vehicle is facilitated.

In one or more optional embodiments, the driving management method further includes: receiving a driver registration request sent by the vehicle or the mobile device, the driver registration request including a registered face image of the driver; and establishing a data set according to the registered face image.

In order to identify whether the driver is registered, the registered face images corresponding to the registered drivers are first stored. In this embodiment, a data set is established for the registered face images at the cloud server, and the registered face images of multiple registered drivers are saved in the data set by the cloud server, ensuring the data safety.

In one or more optional embodiments, operation 820 may include: performing feature matching on the face image and at least one pre-stored face image in the data set to obtain the feature matching result.

In this embodiment, performing feature matching in the cloud server is realized; before matching, the vehicle uploads the face part of at least one image in the video stream to the cloud server; the cloud server performs feature matching on the face part and the face image in the data set to obtain the feature matching result; the vehicle obtains the feature matching result from the cloud server, reducing the data traffic between the vehicle and the cloud server and reducing the network overhead.

In one or more optional embodiments, the driving management method further includes: receiving at least a part of the result of the driver state detection sent by the vehicle, performing early-warning prompt on an abnormal driving state and/or sending an instruction of intelligent driving control to the vehicle.

Optionally, the at least a part of the result includes abnormal driving state information determined according to the driver state detection.

Sending some or all results obtained by the driver state detection to the cloud server may realize backup of the abnormal driving state information. Since it does not need to record the normal driving state, this embodiment only sends the abnormal driving state information to the cloud server. When the obtained result of the driver state detection includes normal driving state information and abnormal driving state information, some results are transmitted, i.e., only the abnormal driving state information is sent to the cloud server. Moreover, when all results of the driver state detection are abnormal driving state information, all abnormal driving state information is sent to the cloud server.

In one or more optional embodiments, the driving management method further includes: executing a control operation corresponding to the result of the driver state detection.

Optionally, if the determined result of the driver state detection satisfies a predetermined prompt/warning condition, e.g., satisfying a preset condition corresponding to the driving prompt state (the driving state is poor) or the driving state level is the driving prompt state (the driving state is poor), outputting prompt/warning information corresponding to the predetermined prompt/warning condition, e.g., prompting the driver with sound (e.g., voice or ringing, and the like)/light (e.g., light up or light flickering, and the like)/vibration and the like to call for attention of the driver so that the driver returns the distracted attention to driving or takes a rest, thereby realizing safe driving and avoiding road traffic accidents; and/or if the determined result of the driver state detection satisfies a predetermined driving mode switching condition, e.g., satisfying a preset condition corresponding to the driving warning state (the driving state is very poor), or the driving state level is the distraction driving warning level (also called the severe fatigue driving level), switching the driving mode to an automatic driving mode to realize safe driving and avoid road traffic accidents; and moreover, prompting the driver with sound (e.g., voice or ringing and the like)/light (e.g., light up or light flickering and the like)/vibration and the like to call for attention of the driver so that the driver returns the distracted attention to driving or takes a rest; and/or if the determined result of the driver state detection satisfies a predetermined information sending condition, sending predetermined information to a predetermined contact or establishing a communication connection to the predetermined contact, for example, it is agreed that when the driver makes certain or some actions, it is indicated that the driver is in a dangerous state or needs help; when these actions are detected, sending the predetermined information (e.g., alarm information, prompt information or dial-up call) to the predetermined contact (for example, alarm call, recent contact's call or the set emergency contact's phone), and establishing a communication connection (e.g., video call, voice call or phone call) to the predetermined contact directly through the vehicle-mounted device to guarantee the driver's personal and/or property safety.

Optionally, the driving management method further includes: receiving images or video clips corresponding to the abnormal driving state information.

In this embodiment, in order to prevent data on the vehicle from being accidentally deleted or deliberately deleted, the images or video clips corresponding to the abnormal driving state information may be uploaded to the cloud server for backup. When the information is needed, the images or video clips may be downloaded from the cloud server to the vehicle for viewing, or be downloaded from the cloud server to other clients for viewing.

Optionally, the driving management method further includes: performing at least one of the following operations based on the abnormal driving state information: data statistics, vehicle management, and driver management.

The cloud server may receive the abnormal driving state information of multiple vehicles and may realize management of the vehicles and drivers based on big data statistics to provide better service for the vehicles and drivers.

Optionally, the performing data statistics based on the abnormal driving state information includes: collecting statistics about the received images or video clips corresponding to the abnormal driving state information based on the abnormal driving state information so that the images or video clips are classified according to different abnormal driving states to determine the statistical situation of each of the abnormal driving states.

The classified statistics is performed on each different abnormal driving state to obtain the abnormal driving state often done by the driver based on big data, and to provide more reference data for the vehicle developer so as to provide settings or apparatuses that are more suitable for the abnormal driving state in the vehicle to provide a more comfortable driving environment for the driver.

Optionally, the performing vehicle management based on the abnormal driving state information includes: collecting statistics about the received images or video clips corresponding to the abnormal driving state information based on the abnormal driving state information so that the images or video clips are classified according to different vehicles to determine the abnormal driving statistical situation of each of the vehicles.

By collecting statistics about the abnormal driving state information based on the vehicle, the abnormal driving state information of all drivers corresponding to the vehicle may be processed, for example, when a problem occurs to a certain vehicle, the responsibility determination may be realized by checking all pieces of abnormal driving state information corresponding to the vehicle.

Optionally, the performing driver management based on the abnormal driving state information includes: processing the received images or video clips corresponding to the abnormal driving state information based on the abnormal driving state information so that the images or video clips are classified according to different drivers to determine the abnormal driving statistical situation of each driver.

By collecting statistics about the abnormal driving state information based on the driver, each driver's driving habits and frequently occurring problems can be obtained, and each driver can be provided with personalized service, and drivers with good driving habits would not be interfered, while achieving the purpose of safe driving. For example, after collecting statistics about the abnormal driving state information, it is determined that a certain driver often yawns while driving, and prompt information of higher volume can be provided for the driver.

A person of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method is executed. Moreover, the foregoing storage medium includes various media capable of storing program codes such as ROM, RAM, a magnetic disk, or an optical disk.

Figure 9:
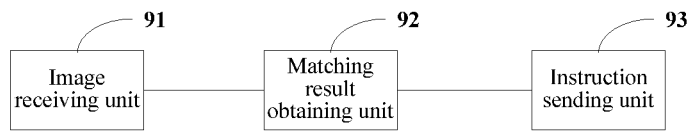
FIG. 9 is a schematic structural diagram of an electronic device according to some embodiments of the present disclosure.

FIG. 9 is a schematic structural diagram of an electronic device according to some embodiments of the present disclosure. The electronic device of this embodiment can be used for realizing each embodiment of the foregoing driving management method of the present disclosure. As shown in FIG. 9, the electronic device of this embodiment includes: an image receiving unit 91, configured to receive a to-be-identified face image sent by a vehicle; a matching result obtaining unit 92, configured to obtain a feature matching result of the face image and at least one pre-stored face image in a data set, optionally, the data set stores a pre-stored face image of at least one registered driver; optionally, the feature matching result of the face image and at least one pre-stored face image in the data set is obtained from the vehicle; and an instruction sending unit 93, configured to send, if the feature matching result represents that the feature matching is successful, an instruction of allowing controlling the vehicle to the vehicle.

Based on the electronic device provided by the foregoing embodiments of the present disclosure, by realizing the face feature matching at the vehicle, the dependence of the driver identification on a network is reduced, feature matching can be realized without the network, and thus, the safety guarantee of the vehicle is further improved.

Optionally, the electronic device further includes: a first data sending unit, configured to receive a data set download request sent by the vehicle, the data set storing a pre-stored face image of at least one registered driver; and send the data set to the vehicle.

In one or more optional embodiments, the electronic device further includes: a registration request receiving unit, configured to receive a driver registration request sent by the vehicle or the mobile device, the driver registration request including a registered face image of the driver; and establish a data set according to the registered face image.

In one or more optional embodiments, the matching result obtaining unit 92 is configured to perform feature matching on the face image and at least one pre-stored face image in the data set to obtain the feature matching result.

In one or more optional embodiments, the electronic device further includes: a detection result receiving unit, configured to receive at least a part of the result of the driver state detection sent by the vehicle, perform early-warning prompt on an abnormal driving state and/or send an instruction of intelligent driving control to the vehicle.

Optionally, the at least a part of the result includes abnormal driving state information determined according to the driver state detection.

In one or more optional embodiments, the electronic device further includes: an execution control unit, configured to execute a control operation corresponding to the result of the driver state detection.

Optionally, the execution control unit is configured to: if the determined result of the driver state detection satisfies a predetermined prompt/warning condition, output prompt/warning information corresponding to the predetermined prompt/warning condition; and/or, if the determined result of the driver state detection satisfies a predetermined information sending condition, sending predetermined information to a predetermined contact or establishing a communication connection to the predetermined contact; and/or, if the determined result of the driver state detection satisfies a predetermined driving mode switching condition, switching the driving mode to an automatic driving mode.

Optionally, the electronic device further includes: a video receiving unit, configured to receive images or video clips corresponding to the abnormal driving state information.

Optionally, the electronic device further includes: an abnormality processing unit, configured to perform at least one of the following operations based on the abnormal driving state information: data statistics, vehicle management, and driver management.

Optionally, the abnormality processing unit is configured, when performing data statistics based on the abnormal driving state information, to: collect statistics about the received images or video clips corresponding to the abnormal driving state information based on the abnormal driving state information so that the images or video clips are classified according to different abnormal driving states to determine the statistical situation of each of the abnormal driving states.

Optionally, the abnormality processing unit is configured, when performing vehicle management based on the abnormal driving state information, to: collect statistics about the received images or video clips corresponding to the abnormal driving state information based on the abnormal driving state information so that the images or video clips are classified according to different vehicles to determine the abnormal driving statistical situation of each vehicle.

Optionally, the abnormality processing unit is configured, when performing driver management based on the abnormal driving state information, to: process the received images or video clips corresponding to the abnormal driving state information based on the abnormal driving state information so that the images or video clips are classified according to different drivers to determine the abnormal driving statistical situation of each driver.

For the working process and the setting manner of any embodiment of the electronic device provided by the embodiments of the present disclosure, reference may be made to the specific description of the corresponding method embodiment of the present disclosure, and details are not described herein again due to space limitation.

A driving management system provided according to another aspect of the embodiments of the present disclosure includes: a vehicle and/or a cloud server; the vehicle is configured to execute any driving management method according to the embodiments shown in FIGS. 1-6; and the cloud server is configured to execute any driving management method according to the embodiment shown in FIG. 8.

Optionally, the driving management system further includes: a mobile device, configured to: receive a driver registration request, the driver registration request including a registered face image of a driver; and send the driver registration request to the cloud server.

Figure 10:
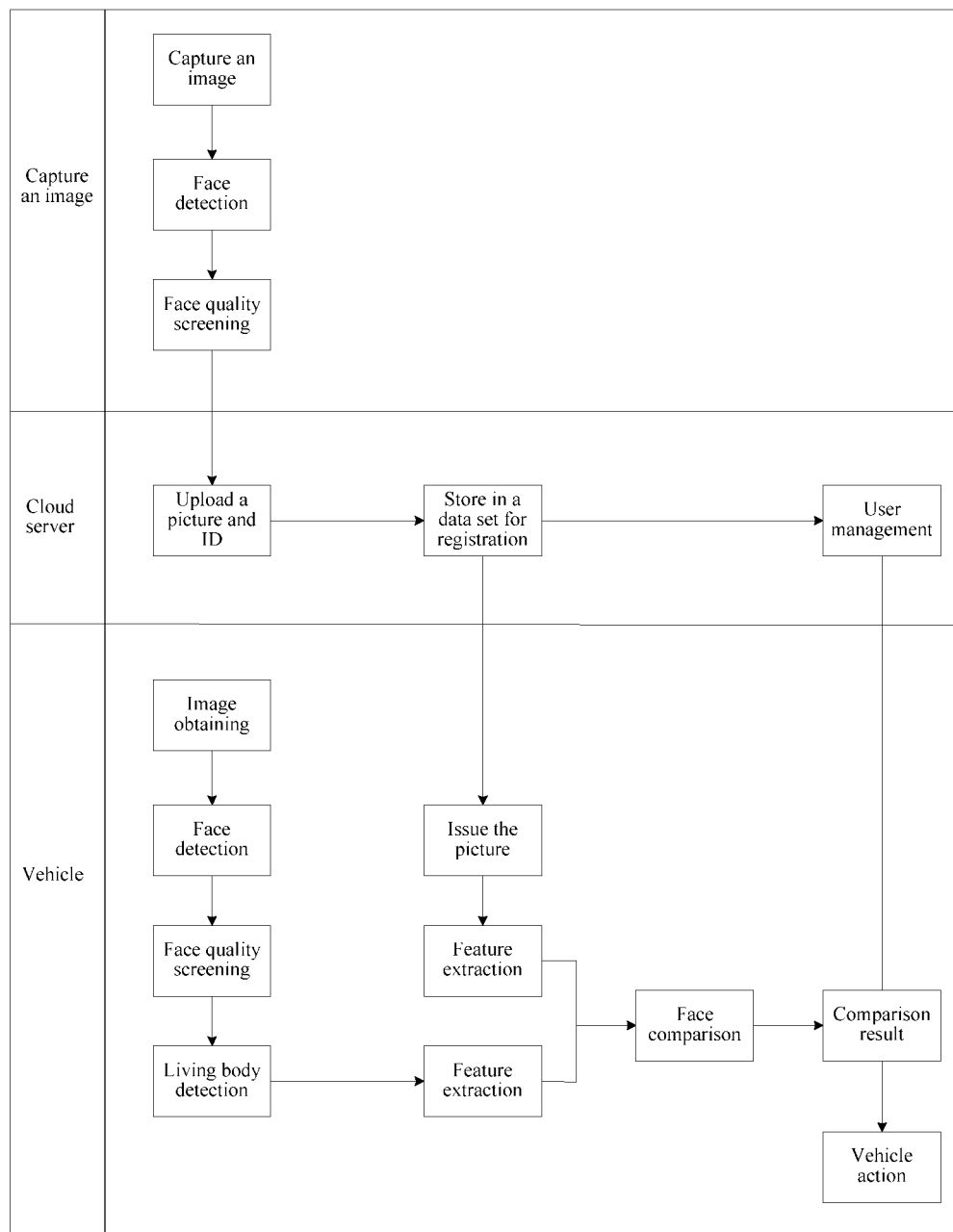
FIG. 10 is a use flowchart of a driving management system according to some embodiments of the present disclosure.

FIG. 10 is a use flowchart of a driving management system according to some embodiments of the present disclosure. As shown in FIG. 10, the registration process implemented by the foregoing embodiments is realized on a mobile phone (a mobile device), the screened face image and the ID information (identity information) of the driver are uploaded to the cloud server; the cloud server stores the face image and the ID information of the driver as well as user permission information corresponding to the face image in a data set; when permission matching is required, the data set is downloaded by the vehicle client to the vehicle client for matching; the vehicle client obtains the driver image, performs face detection, quality screening and living body identification on the driver image in sequence, and matches the screened to-be-identified face image with all face images in the data set; the matching is realized based on the face feature; the face feature is extracted by the neural network; the permission information corresponding to the to-be-identified face image is determined based on the comparison result; and the vehicle action is controlled based on the permission information.

Figure 11:
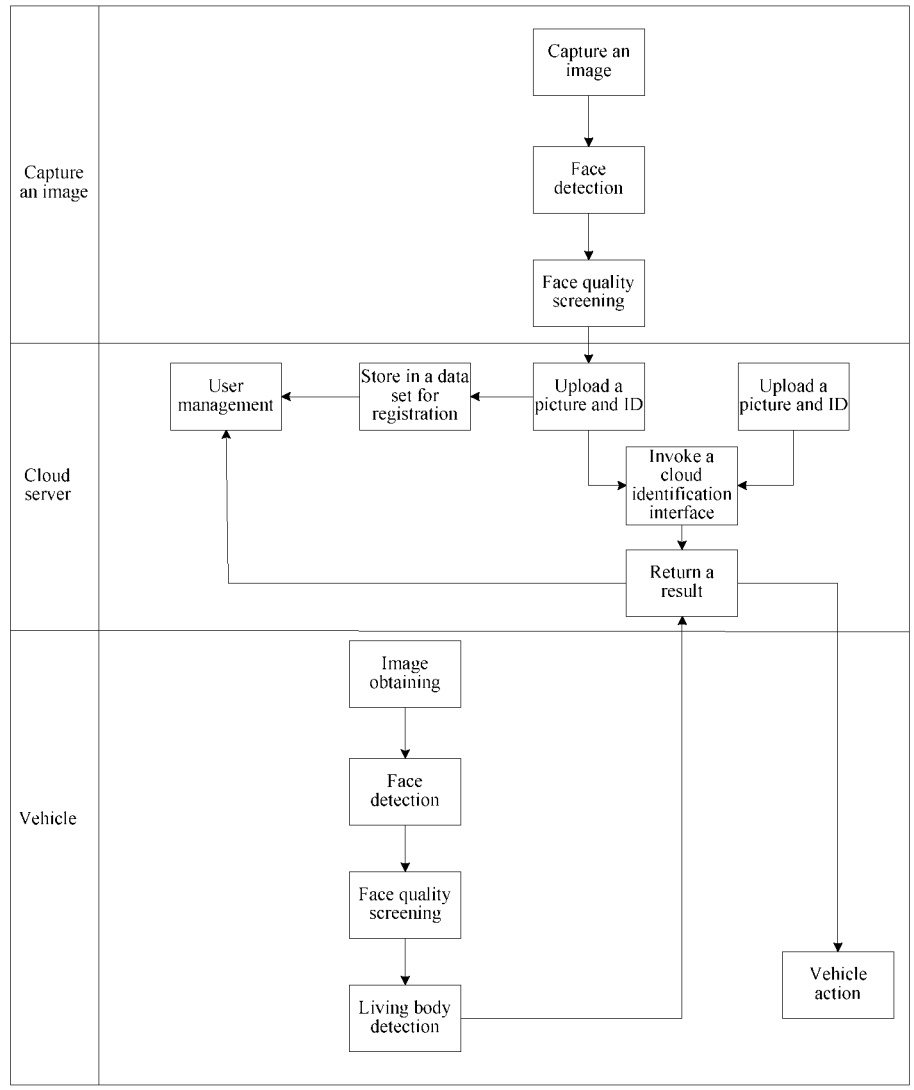
FIG. 11 is a use flowchart of a driving management system according to some other embodiments of the present disclosure.

FIG. 11 is a use flowchart of a driving management system according to some other embodiments of the present disclosure. As shown in FIG. 11, the registration process implemented by the foregoing embodiments is realized on a mobile phone (a mobile device), the screened face image and the ID information (identity information) of the driver are uploaded to the cloud server; the cloud server stores the face image and the ID information of the driver as well as user permission information corresponding to the face image in a data set; when permission matching is required, the to-be-identified face image uploaded by the vehicle client is received; the to-be-identified face image matches with all face images in the data set; the matching is realized based on the face feature; the face feature is extracted by the neural network; the permission information corresponding to the to-be-identified face image is determined based on the comparison result; and the vehicle action is controlled based on the permission information. The vehicle client obtains the driver image, and performs face detection, quality screening and living body identification on the driver image in sequence to obtain the to-be-identified face image.

An electronic device provided according to another aspect of the embodiments of the present disclosure includes: a memory, configured to store an executable instruction; and a processor, configured to communicate with the memory to execute the executable instruction so as to complete the driving management method according to any one of the foregoing embodiments.

Figure 12:
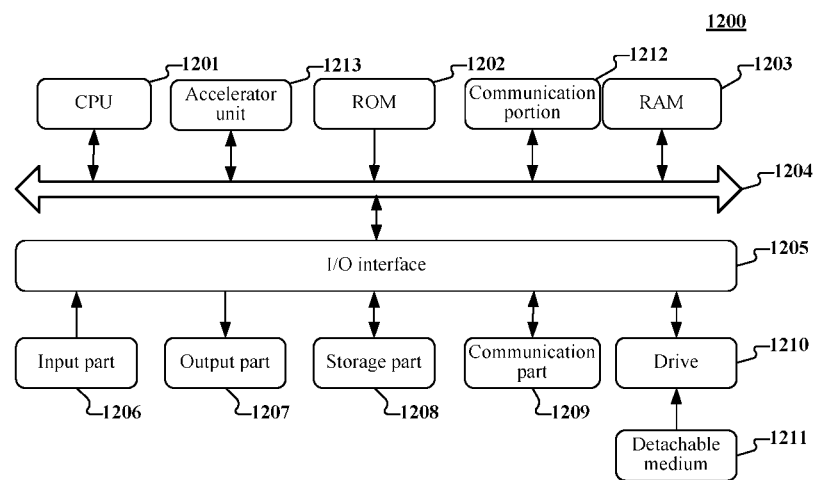
FIG. 12 is a schematic structural diagram of an application example of the electronic device according to some embodiments of the present disclosure.

FIG. 12 is a schematic structural diagram of an application example of an electronic device according to some embodiments of the present disclosure. With reference to FIG. 12 below, FIG. 12 is a schematic structural diagram of an electronic device suitable for implementing a terminal device or a server of an embodiment of the present disclosure. As shown in FIG. 12, the electronic device includes one or more processors, a communication unit and the like; the one or more processors are, for example, one or more central processing units (CPUs) 1201, and/or one or more accelerator units 1213 or the like; the accelerator units may include, but are not limited to, GPU, FPGA, and other types of special purpose processors or the like; the processor may execute various appropriate actions and processing according to executable instructions stored in a read only memory (ROM) 1202 or executable instructions loaded from a memory portion 1208 into a random access memory (RAM) 1203. The communication portion 1212 may include, but is not limited to, a network card, which may include, but is not limited to, an IB (Infiniband) network card, and the processor may communicate with the ROM 1202 and/or the RAM 1203 to execute executable instructions, is connected to the communication portion 1212 through the bus 1204, and communicates with other target devices by the communication portion 1212, thereby completing operations corresponding to any method provided by the embodiments of the present disclosure, for example, controlling a camera assembly provided on a vehicle to collect a video stream of a vehicle driver; obtaining a feature matching result of a face part of at least one image in the video stream and at least one pre-stored face image in a data set; and if the feature matching result represents that the feature matching is successful, controlling the vehicle to execute an operation instruction received by the vehicle.

In addition, the RAM 1203 may further store various programs and data required during an operation of the apparatus. The CPU 1201, the ROM 1202, and the RAM 1203 are connected to each other via the bus 1204. In the presence of the RAM 1203, the ROM 1202 is an optional module. The RAM 1203 stores executable instructions, or writes executable instructions to the ROM 1202 during running. The executable instructions cause the CPU 1201 to perform the operations corresponding to any one of the foregoing methods of the present disclosure. An input/output (I/O) interface 1205 is also connected to the bus 1204. The communication portion 1212 may be integrated, or may be set as having multiple sub-modules (for example, multiple IB network cards) respectively connected to the bus.

The following assemblies are connected to the I/O interface 1205: an input part 1206 including a keyboard, a mouse and the like; an output part 1207 including a cathode-ray tube (CRT), a liquid crystal display (LCD), a speaker and the like; a storage part 1208 including a hard disk and the like; and a communication part 1209 of a network interface card including an LAN card, a modem and the like. The communication part 1209 executes communication processing through a network such as the Internet. A drive 1210 is also connected to the I/O interface 1205 according to requirements. A detachable medium 1211 such as a magnetic disk, an optical disk, a magneto-optical disk, a semiconductor memory or the like is mounted on the drive 1210 according to requirements, so that a computer program read from the detachable medium may be installed on the storage part 1208 according to requirements.

It should be noted that, the architecture shown in FIG. 12 is merely an optional implementation. During specific practice, a number and types of the assemblies in FIG. 12 may be selected, decreased, increased, or replaced according to actual requirements. Different functional assemblies may be separated or integrated or the like. For example, the accelerator unit 1213 and the CPU 1201 may be separated, or the accelerator unit 1213 may be integrated on the CPU 1201, and the communication portion may be separated from or integrated on the CPU 1201 or the accelerator unit 1213 or the like. These alternative implementations all fall within the protection scope of the present disclosure.

Particularly, a process described above with reference to a flowchart according to an embodiment of the present disclosure may be implemented as a computer software program. For example, an embodiment of the present disclosure includes a computer program product. The computer program product includes a computer program tangibly included in a machine-readable medium. The computer program includes a program code for executing a method shown in the flowchart. The program code may include instructions for executing each corresponding step of the driving state monitoring method according to any one of the embodiments of the present disclosure. In such embodiment, the computer program is downloaded and installed from the network through the communication portion, and/or is installed from the detachable medium. When executed by the CPU 1201, the computer program executes the foregoing function defined in the method of the present disclosure.

A computer storage medium provided according to another aspect of the embodiments of the present disclosure for storing a computer readable instruction. When the instruction is executed, the driving management method according to any one of the foregoing embodiments is executed.

Various embodiments in this description are described in a progressive manner, emphasized descriptions of each embodiment may include a difference between this embodiment and another embodiment, and same or similar parts between the embodiments may be cross-referenced. For the system embodiment, since the system embodiment basically corresponds to the method embodiment, the description is relatively simple. For related parts, refer to related descriptions of the method embodiment.

The methods, the apparatuses, the systems and the devices of the present disclosure may be implemented in many manners. For example, the methods, apparatuses, systems and devices of the present disclosure may be implemented by using software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure may be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual disclosure of the present disclosure, and to make a person of ordinary skill in the art understand the present disclosure, so as to design various embodiments with various modifications applicable to particular use.

The invention claimed is:

1. A driving management method, comprising:
controlling a camera assembly provided on a vehicle to collect a video stream of a vehicle driver;
obtaining a feature matching result of a face part of at least one image in the video stream and at least one pre-stored face image in a data set, wherein the data set stores a pre-stored face image of at least one registered driver, and wherein the data set is stored in a cloud server, and the data set is downloaded to the vehicle, responsive to that the vehicle and the cloud server are in a communication connection state, for the vehicle to perform feature matching without a network connection; and
responsive to that the feature matching result represents that the feature matching is successful, controlling the vehicle to execute an operation instruction received by the vehicle.

2. The method according to claim 1, further comprising:
responsive to that the vehicle and the cloud server are in the communication connection state, sending a data set download request to the cloud server; and
receiving and storing the data set sent by the cloud server.

3. The method according to claim 1, further comprising:
responsive to that the feature matching result represents that the feature matching is successful, obtaining identity information of the vehicle driver according to the pre-stored face image that is succeeded in feature matching; and sending the image and the identity information to the cloud server; or
responsive to that the feature matching result represents that the feature matching is successful, obtaining identity information of the vehicle driver according to the pre-stored face image that is succeeded in feature matching; intercepting the face part in the image; and sending the intercepted face part and the identity information to the cloud server.

4. The method according to claim 1, further comprising: obtaining a living body detection result of the collected image;
the controlling the vehicle to execute an operation instruction received by the vehicle according to the feature matching result comprises:
controlling the vehicle to execute an operation instruction received by the vehicle according to the feature matching result and the living body detection result.

5. The method according to claim 4, wherein the pre-stored face image in the data set is also correspondingly provided with a driving permission;
the method further comprises: responsive to that the feature matching result represents that the feature matching is successful, obtaining the driving permission corresponding to the pre-stored face image that is succeeded in feature matching;
the controlling the vehicle to execute an operation instruction received by the vehicle comprises: controlling the vehicle to execute an operation instruction received by the vehicle within the permission scope.

6. The method according to claim 1, further comprising:
performing driver state detection based on the video stream; and
performing at least one of: prompting early-warning on an abnormal driving state or performing intelligent driving control according to the result of the driver state detection;
wherein the driver state detection comprises at least one of: driver fatigue state detection, driver distraction state detection, driver's predetermined distraction action detection, or driver gesture detection.

7. The method according to claim 6, wherein the performing driver fatigue state detection based on the video stream comprises:
detecting at least a part of a face region of at least one image in the video stream to obtain state information of the at least a part of the face region, the state information of the at least a part of the face region comprising at least one of: eye open/closed state information or mouth open/closed state information;
obtaining a parameter value of an index for representing a driver fatigue state according to the state information of the at least a part of the face region within a period of time; and
determining the result of the driver fatigue state detection according to the parameter value of the index for representing the driver fatigue state;
wherein the index for representing the driver fatigue state comprises at least one of: an eye closure degree or a yawning degree;
wherein the parameter value of the eye closure degree comprises at least one of: the number of eye closures, eye closure frequency, eye closure duration, eye closure amplitude, the number of eye semi-closures, or eye semi-closure frequency;
the parameter value of the yawning degree comprises at least one of: a yawning state, the number of yawns, yawn duration, or yawning frequency.

8. The method according to claim 6, wherein the performing driver distraction state detection based on the video stream comprises:
performing at least one of face orientation or gaze direction detection on the driver image in the video stream to obtain at least one of face orientation information or gaze direction information;
determining a parameter value of an index for representing a driver distraction state according to at least one of the face orientation information or the gaze direction information within a period of time, the index for representing the driver distraction state comprises at least one of: a face orientation deviation degree or a gaze deviation degree; and
determining the result of the driver distraction state detection according to the parameter value of the index for representing the driver distraction state;
wherein the parameter value of the face orientation deviation degree comprises at least one of: the number of head turns, head turn duration, or head turn frequency;
the parameter value of the gaze deviation degree comprises at least one of: a gaze direction deviation angle, gaze direction deviation duration, or gaze direction deviation frequency.

9. The method according to claim 8, wherein the performing at least one of face orientation or gaze direction detection on the driver image in the video stream comprises:
detecting face key points of the driver image in the video stream; and performing at least one of face orientation or gaze direction detection according to the face key points.

10. The method according to claim 9, wherein the performing face orientation detection according to the face key points to obtain face orientation information comprises:
obtaining feature information of head posture according to the face key points; and
determining the face orientation information according to the feature information of the head posture.

11. The method according to claim 6, wherein the predetermined distraction action comprises at least one of: a smoking action, a drinking action, an eating action, a calling action, or an entertainment action.

12. The method according to claim 11, wherein the performing driver's predetermined distraction action detection based on the video stream comprises:
performing target object detection corresponding to the predetermined distraction action on at least one image in the video stream to obtain a detection frame for a target object; and
determining whether the predetermined distraction action occurs according to the detection frame for the target object.

13. The method according to claim 12, further comprising:
responsive to that the predetermined distraction action occurs, obtaining a parameter value of an index for representing the driver's distraction degree according to a determination result indicating whether the predetermined distraction action occurs within a period of time; and
determining the result of the driver's predetermined distraction action detection according to the parameter value of the index for representing the driver's distraction degree;
wherein the parameter value of the index for representing the driver's distraction degree comprises at least one of: the number of occurrences of the predetermined distraction action, duration of the predetermined distraction action, or frequency of the predetermined distraction action.

14. The method according to claim 11, further comprising:
responsive to that the result of the driver's predetermined distraction action detection is that a predetermined distraction action is detected, prompting the detected distraction action.

15. The method according to claim 6, further comprising:
executing a control operation corresponding to the result of the driver state detection;
wherein the executing a control operation corresponding to the result of the driver state detection comprises at least one of:
responsive to that the determined result of the driver state detection satisfies a predetermined prompt/warning condition, outputting prompt/warning information corresponding to the predetermined prompt/warning condition;
responsive to that the determined result of the driver state detection satisfies a predetermined information sending condition, sending predetermined information to a predetermined contact or establishing a communication connection to the predetermined contact; or
responsive to that the determined result of the driver state detection satisfies a predetermined driving mode switching condition, switching the driving mode to an automatic driving mode.

16. The method according to claim 6, further comprising:
sending at least a part of the result of the driver state detection to the cloud server;
wherein the at least a part of the result comprises abnormal driving state information determined according to the driver state detection.

17. The method according to claim 16, further comprising:
storing images or video clips in the video stream corresponding to the abnormal driving state information; or
sending the images or video clips in the video stream corresponding to the abnormal driving state information to the cloud server.

18. The method according to claim 1, further comprising:
responsive to that the vehicle and a mobile device are in a communication connection state, sending a data set download request to the mobile device; and
receiving and storing the data set sent by the mobile device;
wherein the data set is obtained from the cloud server and sent to the vehicle by the mobile device upon reception of the data set download request.

19. The method according to claim 1, further comprising:
responsive to that the feature matching result represents that the feature matching is unsuccessful, refusing to execute the received operation instruction.

20. The method according to claim 19, further comprising:
sending registration prompt information;
receiving a driver registration request according to the registration prompt information, the driver registration request comprising registered face images of the driver; and
establishing a data set according to the registered face images.

21. The method according to claim 1, wherein the obtaining a feature matching result of a face part of at least one image in the video stream and at least one pre-stored face image in a data set comprises:
responsive to that the vehicle and the cloud server are in a communication connection state, uploading the face part of at least one image in the video stream to the cloud server, and receiving the feature matching result sent by the cloud server.

22. A non-transitory computer storage medium for storing a computer readable instruction, wherein when the instruction is executed, the driving management method according to claim 1 is performed.

23. A driving management method, comprising:
receiving a to-be-identified face image sent by a vehicle;
obtaining a feature matching result of the face image and at least one pre-stored face image in a data set, wherein the data set stores a pre-stored face image of at least one registered driver, and wherein the data set is stored in a cloud server, and the data set is downloaded to the vehicle, responsive to that the vehicle and the cloud server are in a communication connection state, for the vehicle to perform feature matching without a network connection; and
responsive to that the feature matching result represents that the feature matching is successful, sending an instruction of allowing controlling the vehicle to the vehicle.

24. The method according to claim 23, further comprising:
   receiving a data set download request sent by the vehicle, the data set storing a pre-stored face image of at least one registered driver; and
   sending the data set to the vehicle.

25. The method according to claim 23, further comprising:
   receiving a driver registration request sent by the vehicle or mobile device, the driver registration request comprising a registered face image of the driver; and
   establishing a data set according to the registered face image.

26. The method according to claim 23, wherein the obtaining a feature matching result of the face image and at least one pre-stored face image in a data set comprises:
   performing feature matching on the face image and at least one pre-stored face image in the data set to obtain the feature matching result; or
   obtaining the feature matching result of the face image and at least one pre-stored face image in the data set from the vehicle.

27. The method according to claim 23, further comprising:
   receiving at least a part of the result of driver state detection sent by the vehicle, performing at least one of prompting early-warning on an abnormal driving state or sending an instruction of intelligent driving control to the vehicle;
   wherein the at least a part of the result comprises abnormal driving state information determined according to the driver state detection.

28. The method according to claim 27, further comprising: executing a control operation corresponding to the result of the driver state detection;
   wherein the executing a control operation corresponding to the result of the driver state detection comprises:
   responsive to that the determined result of the driver state detection satisfies a predetermined prompt/warning condition, outputting prompt/warning information corresponding to the predetermined prompt/warning condition;
   responsive to that the determined result of the driver state detection satisfies a predetermined information sending condition, sending predetermined information to a predetermined contact or establishing a communication connection to the predetermined contact;
   responsive to that the determined result of the driver state detection satisfies a predetermined driving mode switching condition, switching the driving mode to an automatic driving mode.

29. The method according to claim 27, further comprising:
   receiving images or video clips corresponding to the abnormal driving state information.

30. The method according to claim 29, further comprising:
   performing at least one of the following operations based on the abnormal driving state information:
   data statistics, vehicle management, or driver management;
   wherein the performing data statistics based on the abnormal driving state information comprises:
   collecting statistics about the received images or video clips corresponding to the abnormal driving state information based on the abnormal driving state information so that the images or video clips are classified according to different abnormal driving states to determine the statistical situation of each of the abnormal driving states;
   wherein the performing vehicle management based on the abnormal driving state information comprises:
   collecting statistics about the received images or video clips corresponding to the abnormal driving state information based on the abnormal driving state information so that the images or video clips are classified according to different vehicles to determine the abnormal driving statistical situation of each of the vehicles;
   wherein the performing driver management based on the abnormal driving state information comprises:
   processing the received images or video clips corresponding to the abnormal driving state information based on the abnormal driving state information so that the images or video clips are classified according to different drivers to determine the abnormal driving statistical situation of each of the drivers.

31. An electronic device, comprising: a memory, configured to store an executable instruction;
   and
   a processor, configured to communicate with the memory to execute the executable instruction to perform operations, the operations comprising:
   controlling a camera assembly provided on a vehicle to collect a video stream of a vehicle driver;
   obtaining a feature matching result of a face part of at least one image in the video stream and at least one pre-stored face image in a data set, wherein the data set stores a pre-stored face image of at least one registered driver, and wherein the data set is stored in a cloud server, and the data set is downloaded to the vehicle, responsive to that the vehicle and the cloud server are in a communication connection state, for the vehicle to perform feature matching without a network connection; and
   responsive to that the feature matching result represents that the feature matching is successful, controlling the vehicle to execute an operation instruction received by the vehicle.

* * * * *